US010215548B2

(12) United States Patent
Sajedi

(10) Patent No.: US 10,215,548 B2
(45) Date of Patent: *Feb. 26, 2019

(54) ULTRA-LIGHT AND ULTRA-ACCURATE PORTABLE COORDINATE MEASUREMENT MACHINE

(71) Applicant: SA08700334, Grand Cayman (KY)

(72) Inventor: Allen Sajedi, Orlando, FL (US)

(73) Assignee: SA08700334, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,552

(22) Filed: Oct. 18, 2017

(65) Prior Publication Data

US 2018/0299244 A1 Oct. 18, 2018

Related U.S. Application Data

(63) Continuation of application No. 15/730,517, filed on Oct. 11, 2017, which is a continuation-in-part of application No. 15/486,427, filed on Apr. 13, 2017, now Pat. No. 9,803,973.

(51) Int. Cl.
*G01B 5/008* (2006.01)
*G01B 5/00* (2006.01)
*G05B 19/404* (2006.01)
*H04B 1/02* (2006.01)

(52) U.S. Cl.
CPC .......... *G01B 5/008* (2013.01); *G01B 5/0016* (2013.01); *G05B 19/404* (2013.01); *G01B 5/0004* (2013.01); *G01B 2210/58* (2013.01); *G05B 2219/37193* (2013.01); *G05B 2219/49054* (2013.01); *H04B 1/02* (2013.01)

(58) Field of Classification Search
CPC ....................................................... G01B 5/008
USPC ............................................................ 33/503
See application file for complete search history.

(56) References Cited

U.S. PATENT DOCUMENTS

| 4,888,877 | A |   | 12/1989 | Enderle et al. |
| 5,402,582 | A | * | 4/1995  | Raab ...................... G01B 5/008 33/1 PT |
| 5,596,189 | A |   | 1/1997  | Orton |
| 5,611,147 | A |   | 3/1997  | Raab |

(Continued)

OTHER PUBLICATIONS

P.A. Orton et al., *Automatic Self-Calibration of an Incremental Motion Encoder*, IEEE Instrument and Measurement Technology Conference, Budapest, Hungary, May 21-23, 2001, at 1614.

(Continued)

*Primary Examiner* — Christopher W Fulton
(74) *Attorney, Agent, or Firm* — Renner, Otto, Boisselle & Sklar, LLP

(57) ABSTRACT

A portable coordinate measurement machine (CMM) includes an articulated arm including rotary joints. At least one of the rotary joints includes bearings; a shaft that engages an inner diameter of the bearings, the shaft configured to rotate about an axis of rotation of the bearings; a housing having at least one port that engages an outer diameter of at least one of the bearings; and at least one transducer configured to output an angle signal corresponding to an angle of rotation of the shaft relative to the housing about the axis of rotation. Structural portions of the CMM are fabricated from steel, stainless steel, or alloys lighter in weight than steel but having a thermal expansion coefficient matching that of steel.

20 Claims, 24 Drawing Sheets

(56) References Cited

U.S. PATENT DOCUMENTS

| | | | |
|---|---|---|---|
| 5,829,148 A | 11/1998 | Eaton | |
| 6,170,358 B1 | 1/2001 | Hunter et al. | |
| 6,219,928 B1 | 4/2001 | Raab et al. | |
| 6,249,985 B1 * | 6/2001 | Piko | B23Q 1/5406 33/503 |
| 6,374,198 B1 | 4/2002 | Schifa et al. | |
| 6,519,860 B1 | 2/2003 | Bieg | |
| 6,668,466 B1 * | 12/2003 | Bieg | G01B 5/008 33/1 PT |
| 6,892,465 B2 | 5/2005 | Raab et al. | |
| 6,920,697 B2 | 7/2005 | Raab et al. | |
| 6,935,036 B2 | 8/2005 | Raab et al. | |
| 6,957,496 B2 | 10/2005 | Raab et al. | |
| 6,965,843 B2 | 11/2005 | Raab et al. | |
| 7,050,930 B2 | 5/2006 | Raab et al. | |
| 7,051,450 B2 | 5/2006 | Raab et al. | |
| 7,069,664 B2 | 7/2006 | Raab et al. | |
| 7,073,271 B2 | 7/2006 | Raab et al. | |
| 7,246,030 B2 | 7/2007 | Raab et al. | |
| 7,430,068 B2 | 9/2008 | Becker et al. | |
| 7,519,493 B2 | 4/2009 | Atwell et al. | |
| 7,546,689 B2 * | 6/2009 | Ferrari | G01B 5/0014 33/1 N |
| 7,624,510 B2 | 12/2009 | Ferrari | |
| 7,733,544 B2 | 6/2010 | Becker et al. | |
| 7,735,234 B2 | 6/2010 | Briggs et al. | |
| 7,743,524 B2 | 6/2010 | Eaton et al. | |
| 7,774,949 B2 | 8/2010 | Ferrari | |
| 7,881,896 B2 | 2/2011 | Atwell et al. | |
| 8,015,721 B2 | 9/2011 | Eaton et al. | |
| 8,122,610 B2 | 2/2012 | Tait et al. | |
| 8,145,446 B2 | 3/2012 | Atwell et al. | |
| 8,336,220 B2 | 12/2012 | Eaton et al. | |
| 8,402,669 B2 * | 3/2013 | Ferrari | B25J 9/1692 33/503 |
| 8,595,948 B2 | 12/2013 | Raab et al. | |
| 8,699,007 B2 | 4/2014 | Becker et al. | |
| 8,719,474 B2 | 5/2014 | Ossig et al. | |
| 8,931,182 B2 | 1/2015 | Raab et al. | |
| 8,997,362 B2 | 4/2015 | Briggs et al. | |
| 9,234,773 B2 | 1/2016 | Cramer | |
| 9,410,787 B2 | 8/2016 | Raab et al. | |
| 9,423,282 B2 | 8/2016 | Moy | |
| 9,513,100 B2 | 12/2016 | Raab et al. | |
| 9,803,973 B1 * | 10/2017 | Sajedi | G01B 11/005 |
| 2003/0167647 A1 | 9/2003 | Raab et al. | |
| 2005/0166413 A1 * | 8/2005 | Crampton | B25J 13/088 33/503 |
| 2010/0325907 A1 * | 12/2010 | Tait | G01B 5/008 33/503 |
| 2011/0173825 A1 * | 7/2011 | Danielson | G01B 5/012 33/503 |
| 2015/0153149 A1 * | 6/2015 | Pettersson | B25J 18/00 33/503 |
| 2015/0176972 A1 * | 6/2015 | Tait | G01B 5/008 33/503 |
| 2015/0192241 A1 * | 7/2015 | Shannahan | F16H 7/14 248/178.1 |
| 2015/0362305 A1 * | 12/2015 | Ferrari | G01N 29/225 33/503 |

OTHER PUBLICATIONS

U.S. Appl. No. 15/486,427, filed Apr. 13, 2017.
U.S. Appl. No. 15/730,517, filed Oct. 11, 2017.

* cited by examiner

ULTRA-LIGHT AND ULTRA-ACCURATE PORTABLE COORDINATE MEASUREMENT MACHINE

BACKGROUND

The present disclosure relates generally to a coordinate measuring machine and more particularly to a high accuracy, ultra-lightweight portable coordinate measuring machine.

Coordinate measurement machines serve to, among other things, measure points in a three-dimensional space. Coordinate measuring machines trace the measuring points in Cartesian coordinate space (x, y, z), for example. Coordinate measuring machines typically consist of a stand and a tracing system. The stand may serve as a reference point relative to which the tracing system moves in the space in a measurable manner. The tracing system for a portable coordinate measuring machine may include an articulated arm attached to the stand at one end and a measurement probe at the other end.

For the measurement to be useful, it must be accurate. Very high accuracy, however, is difficult to achieve because of factors such as temperature and load conditions. Particularly in portable coordinate measuring machines, warping of the arm caused by thermal changes or by changes in loads has a negative effect on the measurement's accuracy. Consequently, in terms of their performance, conventional portable coordinate measuring machines were not nearly as accurate as conventional, non-portable type coordinate measuring machines.

Accuracy Improvements may be available. Conventionally, however, such improvements came accompanied by significant increases in mass and/or weight of the coordinate measuring machine. Conventional portable coordinate measuring machines of improved accuracy were bulky and heavy. These are undesirable characteristics for coordinate measuring machines, particularly portable coordinate measuring machines. Moreover, processes for constructing and assembling coordinate measuring machines' joints, particularly long joints, with the required precision to obtain accurate measurements have not been available.

SUMMARY OF THE INVENTION

The present disclosure provides a portable coordinate measurement machine (CMM) that is more accurate than prior art coordinate measuring machines. Remarkably, the CMM disclosed herein is also lighter and less bulky.

In a first aspect of the invention, the CMM includes rotary joints whose shaft has no portion with a diameter larger than the inner diameter of the joint's bearings and/or whose housing has a bearing engaging port that has no portion with a diameter narrower than the outer diameter of the joint's bearings.

In another aspect of the invention at least one of the rotary joints includes a rotary damper operably coupled to the shaft and the housing and configured to provide controlled damping of rotational movement of the shaft about the axis of rotation.

In another aspect of the invention rotary damping is built into at least one of the rotary joints to provide controlled damping of rotational movement of the shaft about the axis of rotation.

In another aspect of the invention at least one of the rotary joints includes a rotary damping mechanism configured to provide controlled damping of rotational movement of the shaft about the axis of rotation, and a circuit operably connected to the at least one transducer and configured to output a speed and direction signal corresponding to the speed of the rotational movement of the shaft about the axis of rotation based on the angle signal and time, the circuit further configured to compare the speed signal to a predetermined speed threshold to determine whether the rotational movement occurred at excessive speed resulting in excessive torque.

In another aspect of the invention at least one of the rotary joints includes a rotary damping mechanism configured to provide controlled damping of rotational movement of the shaft about the axis of rotation, and at least one strain gauge operably coupled to at least one of the shaft and the housing and configured to sense strain on the at least one of the shaft and the housing due to the rotational movement of the shaft about the axis of rotation and to output a strain signal that may be used to correct the location of the measurement probe based in part on the strain signal.

In another aspect of the invention in at least one joint of the plurality of joints a) the shaft that engages the inner diameter of at least one of the first bearing and the second bearing and b) the port of the housing that engages the outer diameter of at least one of the first bearing and the second bearing are fabricated of steel.

In another aspect of the invention a first joint, from the plurality of joints, is attached to a second joint, from the plurality of joints, by a steel structure that is in contact with the inner or outer of a bearing of the first joint or the inner or outer race of a bearing of the second joint.

In another aspect of the invention all structural portions of at least one of the plurality of rotary joints are fabricated of steel.

In another aspect of the invention any structural portions of the CMM including the plurality of arm segments and the plurality of rotary joints are fabricated of a controlled expansion alloy lighter in weight than steel and having a thermal expansion coefficient matching that of steel or stainless steel in the range of between of 9.9 to 18 μm/m° C. at 25° C.

In another aspect of the invention the measurement probe includes a handle mechanically but not electrically operably coupled to the first end, the handle rotatably coupled to the first end to rotate about a central axis of the measurement probe, the handle including a wireless transmitter, and at least one switch button operably connected to the wireless transmitter and configured to, when pressed, cause the wireless transmitter to transmit a wireless signal that causes the CMM to take a measurement.

In another aspect of the invention an electrical circuit includes a serial communication circuit configured without a dedicated capture wire to receive the angle signal and other angle signals from other transducers in the CMM, the electrical circuit configured to output an agglomeration of the angle signal and the other angle signals to provide information corresponding to a position of the measurement probe relative to the base.

In another aspect of the invention the shaft may include a middle portion and first and second end portions fixedly attached to ends of the middle portion. The first and second end portions may be concentric to within one tenth of one thousands of an inch (0.0001"). The first end portion engages an inner diameter of the first bearing and the second end portion engages an inner diameter of the second bearing. The shaft is configured to rotate about an axis of rotation of the first bearing and the second bearing. A first housing end has an inner diameter that engages an outer diameter of the first bearing and a second housing end has an inner diameter that engages an outer diameter of the second bearing. The first and second housing ends may be concentric to within five tenth of one thousands of an inch (0.0005"). The first and second bearings may thus be preloaded to remove play.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1A:
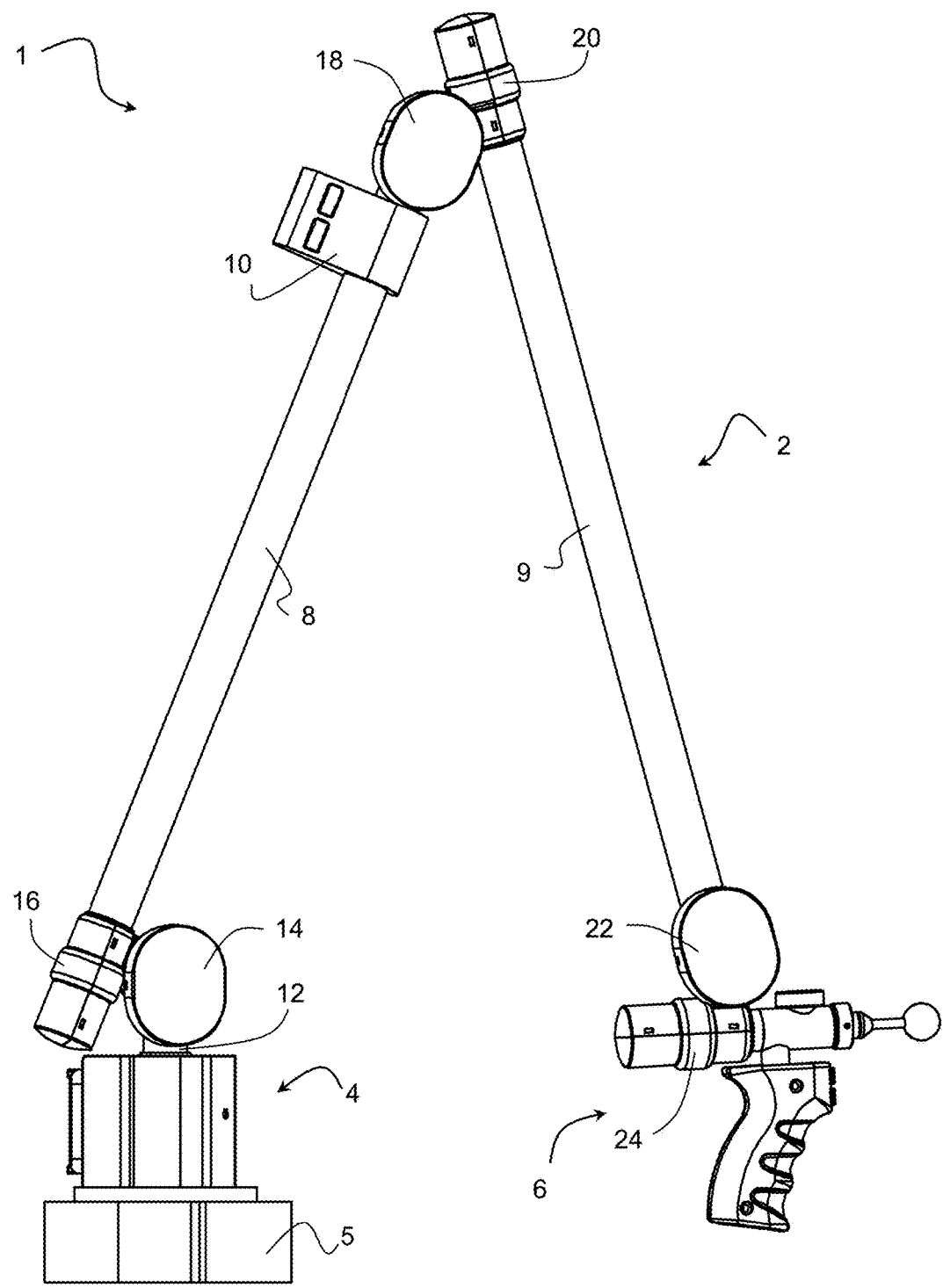
FIGS. 1A-1C illustrate perspective views of an exemplary coordinate measuring machine (CMM).
Figure 1B:
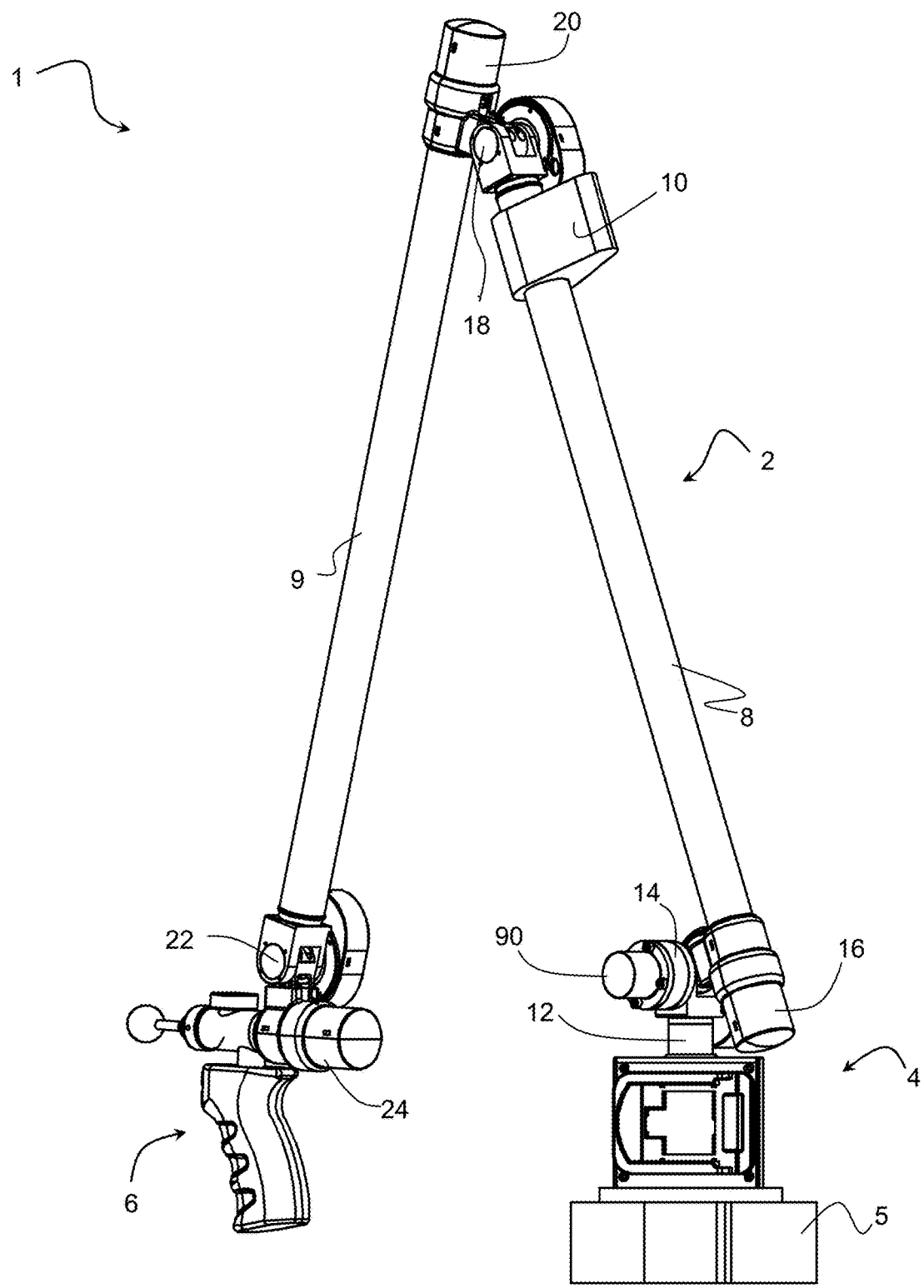
Figure 1C:
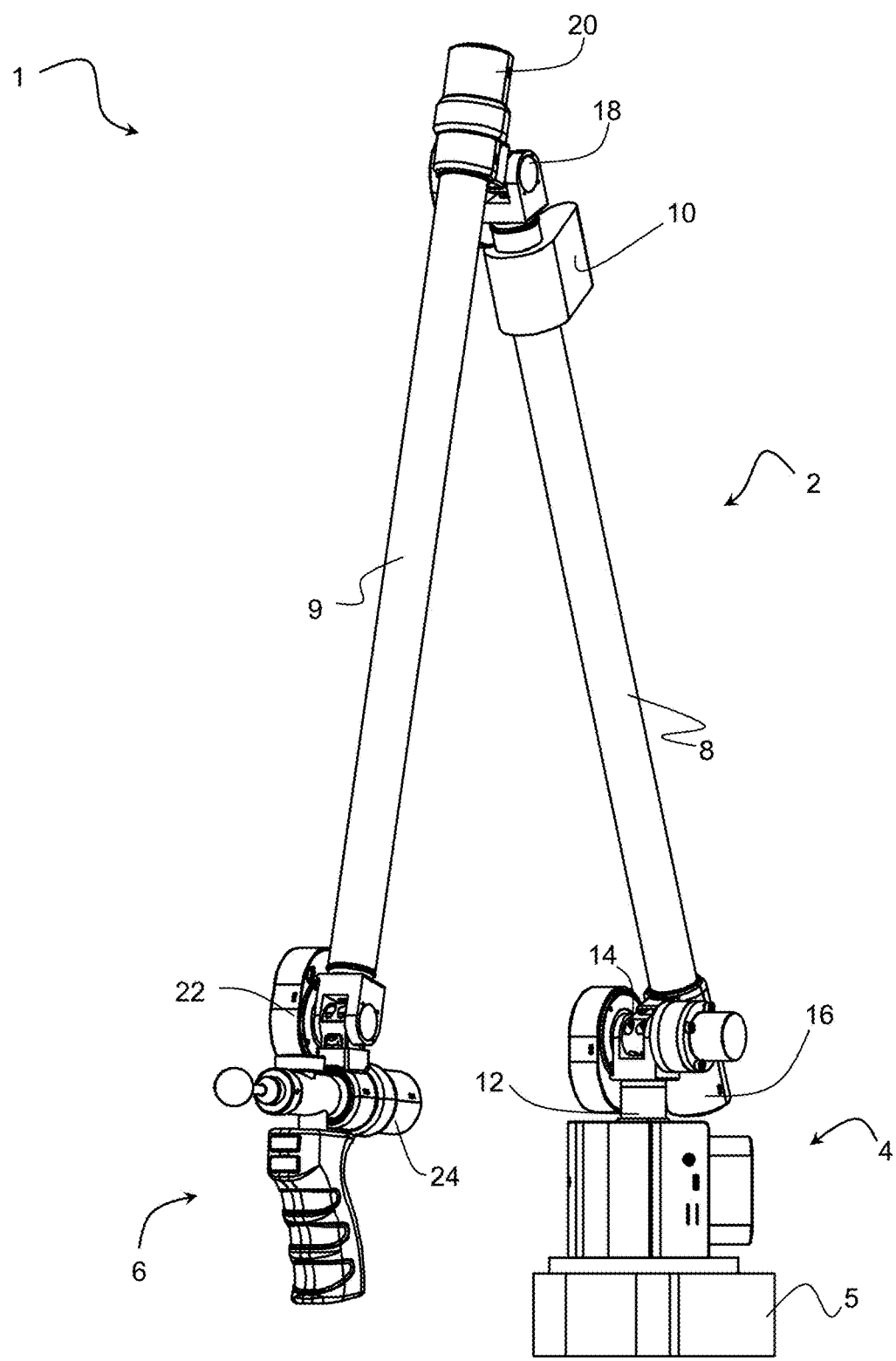
Figure 1D:
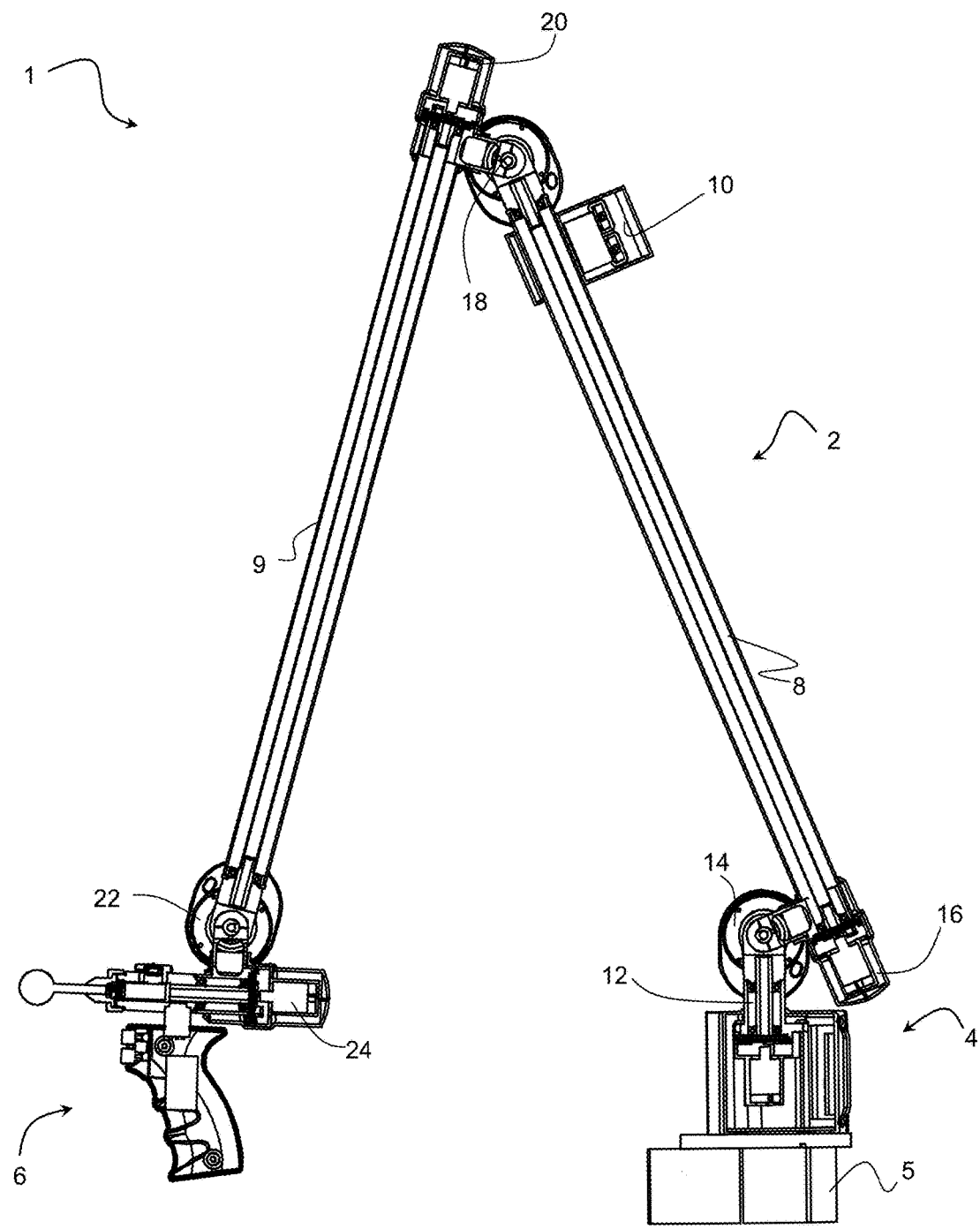
FIG. 1D illustrates a cross-sectional view of the exemplary CMM of FIGS. 1A-1C.

FIGS. 1A-1C illustrate perspective views of an exemplary coordinate measuring machine (CMM) 1. FIG. 1D illustrates a cross-sectional view of the exemplary CMM 1. CMM 1 includes an articulated arm 2, a base 4, and a measurement probe 6. The articulated arm 2 is attached at one end to the base 4 and at the other end to the measurement probe 6. The base 4 may include, for example, a magnetic holder 5 to attach the arm 2 to, for example, a working surface. Articulated arm 2 includes two arm segments 8, 9 and a number of rotary joints 12, 14, 16, 18, 20, 22, 24. The CMM 1 may also include an on-arm switch assembly 10.

The overall length of articulated arm 2 and/or the arm segments 8, 9 may vary depending on its intended application. In one embodiment, the articulated arm may have an overall length of about 48 inches. This arm dimension provides a portable CMM which is well suited for measurements now accomplished using typical hand tools such as micrometers, height gages, calipers and the like. Articulated arm 2 could have smaller or larger dimensions.

The rotary joints generally include two types of joints, swivel joints 12, 16, 20, 24 and hinge joints 14, 18, 22. The swivel joints 12, 16, 20, 24 are positioned generally axially or longitudinally along the arm 2. The hinge joints 14, 18, 22 are positioned generally at 90° to the swivel joints or 90° to the longitudinal axis of the arm 2. The swivel and hinge joints are generally paired up as shown in FIGS. 1A-1D but the joints may be arranged in other configurations. Because of the multiple rotary joints, the arm 2 is manually-positionable meaning that a user is free to manually move the probe 6 to virtually any position within a radius anchored at the base 4 of the CMM 1. Each of these joints are generally shown in FIGS. 2-6A.

In general, the magnetic holder 5 of the base 4 attaches the CMM 1 to a working surface, the base 4 includes the swivel joint 12, which attaches to the hinge joint 14, which attaches to the swivel joint 16, which attaches to the hinge joint 18, which attaches to the swivel joint 20, which attaches to the hinge joint 22, which attaches to the swivel joint 24, which attaches to the measurement probe 6.

Figure 2:
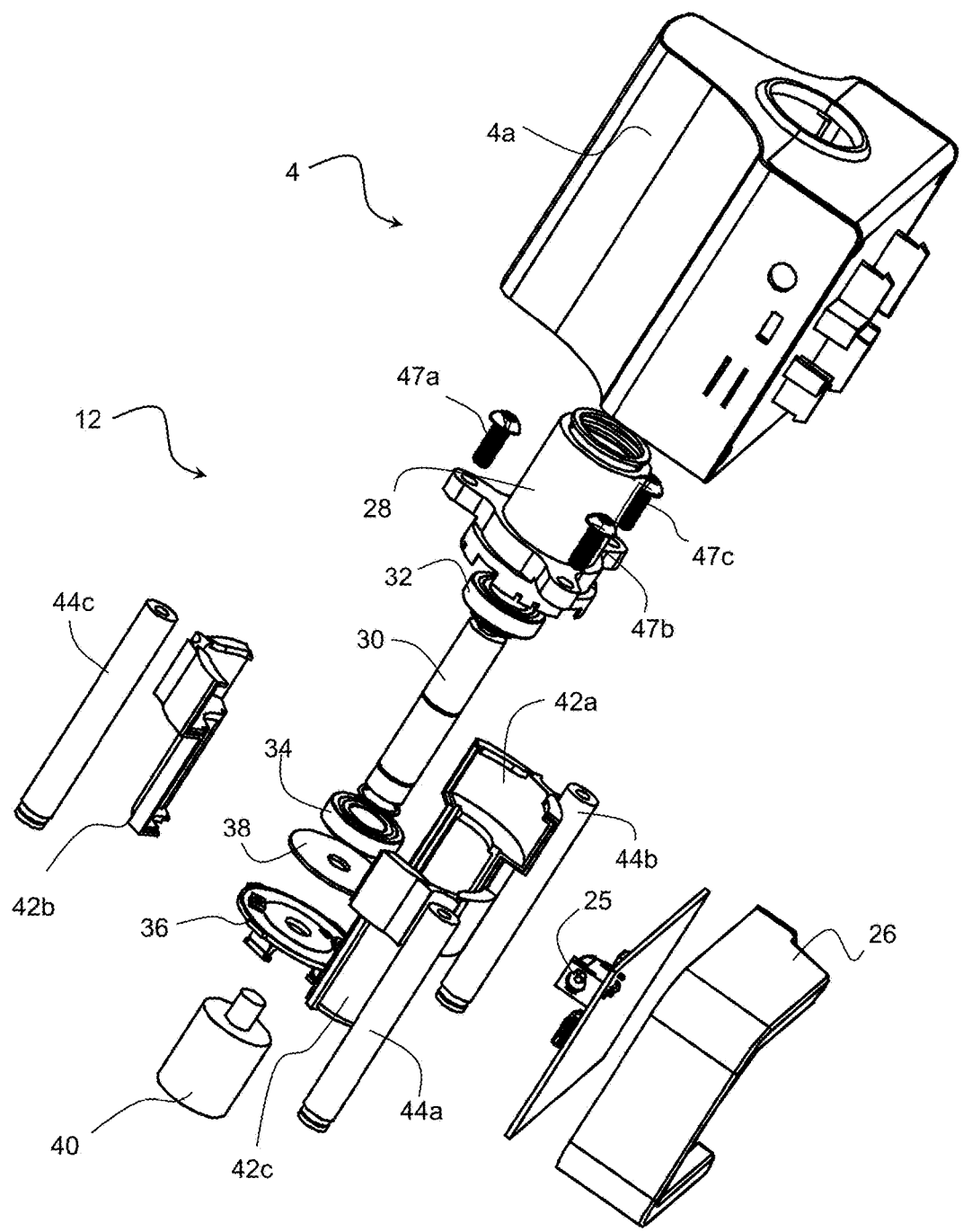
FIG. 2 illustrates an exploded view of an exemplary base and swivel joint of the CMM of FIGS. 1A-1D.

FIG. 2 illustrates an exploded view of exemplary base 4 and swivel joint 12. FIG. 2 also illustrates the base enclosure 4a, which has mounted thereon a battery receptacle 26. The CMM 1 is portable and, therefore, may be operated on battery power from a battery (not shown) installed to the CMM 1 via the receptacle 26. The CMM 1 may also include a power jack 25 to which a power adapter may be connected to power the CMM 1.

The swivel joint 12 may include housing 28, shaft 30, bearings 32, 34, encoder printed circuit board (PCB) 36, encoder disk 38, and slip ring 40. The swivel joint 12 may also include dust covers 42a-c and various hardware such as the threaded studs 44a-c and screws 47a-c. Swivel joints in general are discussed in detail below in reference to swivel joint 16.

Figure 3A:
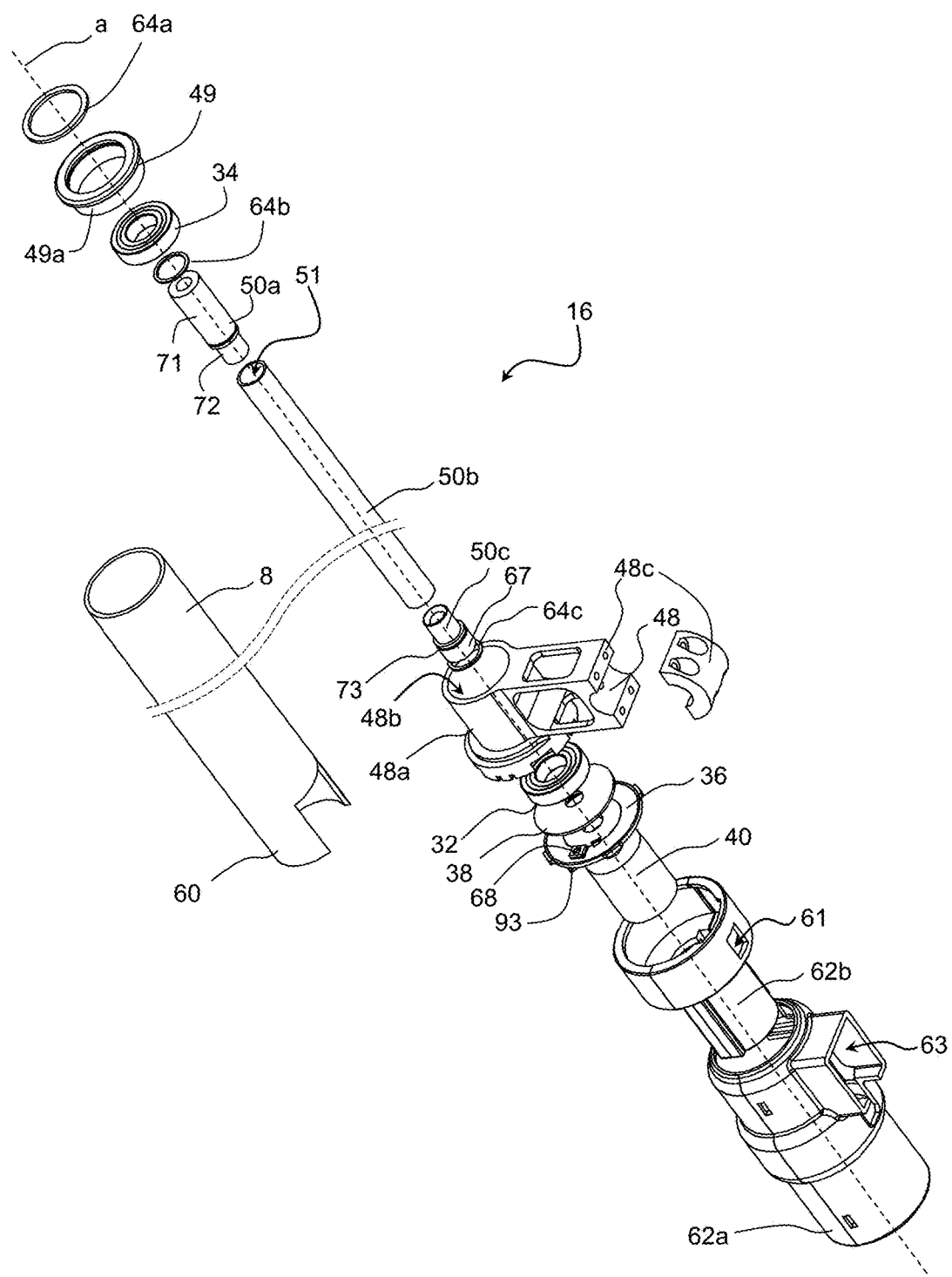
FIGS. 3A and 3B illustrate partial exploded and cross-sectional views, respectively, of an exemplary swivel joint of the CMM of FIGS. 1A-1D.
Figure 3B:
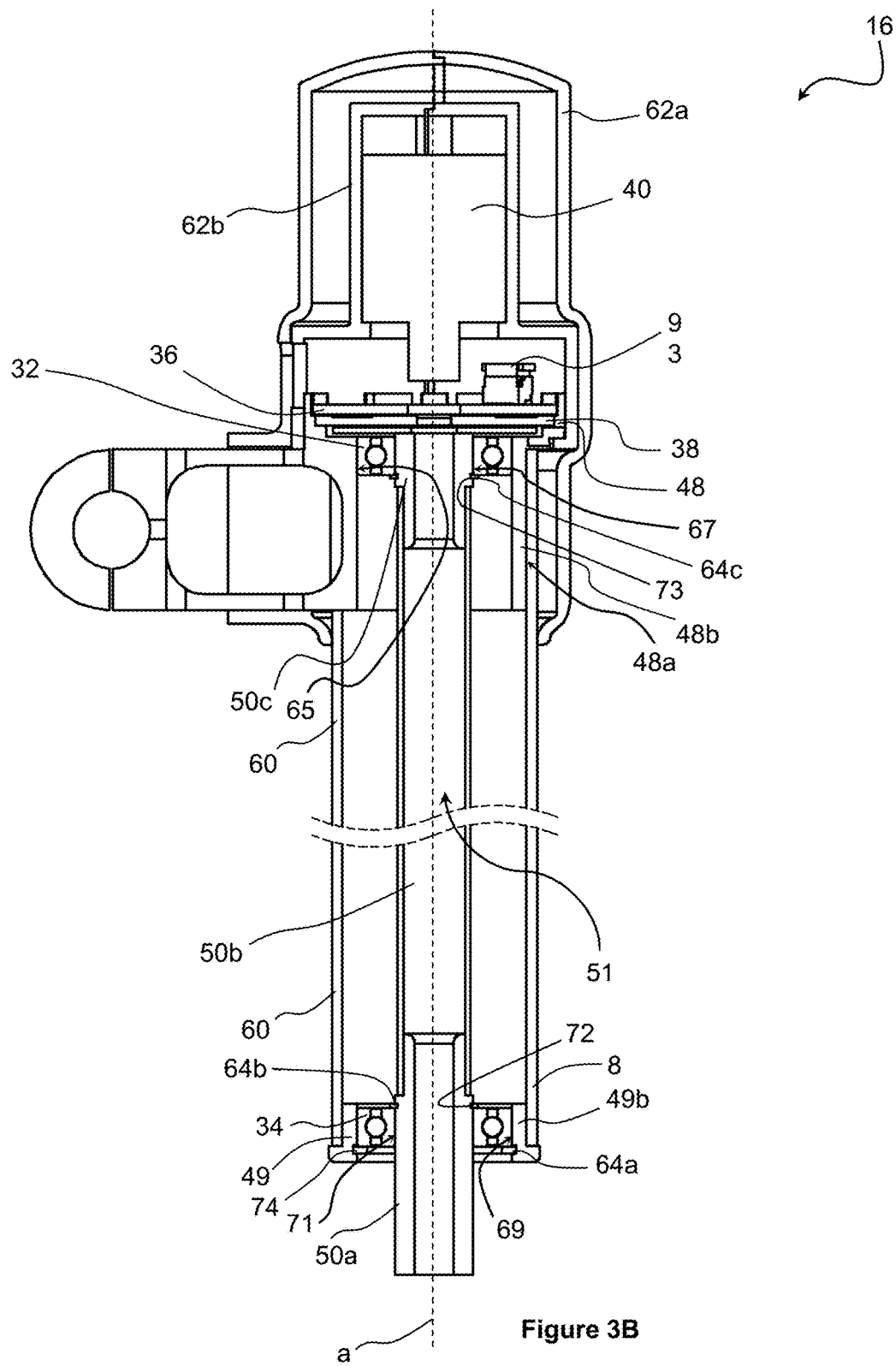

FIG. 3A illustrates partial exploded views of exemplary swivel joint 16 while FIG. 3B illustrates partial cross-sectional views of swivel joint 16. Each of the figures illustrates only the ends of the swivel joint 16; the middle portion of the swivel joint not illustrated corresponds to the arm segment 8. The swivel joint 16 will be used here to describe swivel joints 12, 16, 20, 24 in general even though the swivel joints may not be identical. The swivel joints 16 and 20 are very similar. Swivel joint 24 is also similar to swivel joints 16 and 20 except that, as described below, swivel joint 24 has a shorter shaft. At least some of the components of swivel joint 16 are substantially similar to components discussed in detail above in reference to swivel joint 12 and thus these similar components are identified in FIGS. 3A and 3B with the same reference designators as in FIG. 2.

The swivel joint 16 may include housings 48, 49, shaft portions 50*a*, 50*b*, and 50*c*, bearings 32, 34, encoder PCB 36, encoder disk 38, and slip ring 40. The bearings 32, 34 are preferably steel or stainless steel ball bearings. The shaft portions 50*a* and 50*c* may be operably attached to the ends of the shaft portion 50*b* to form a shaft assembly 50 as described in detail below. The shaft portion 50*b*, being relatively long may be fabricated of rigid yet relatively lighter material such as, for example, carbon fiber, aluminum, etc. as well as from steel. The shaft portions 50*a* and 50*c*, however, may be fabricated of steel to match the material from which the bearings 32, 34 are fabricated. Similar to the relatively long shaft portion 50*b*, the tube 60 within which the shaft portion 50*b* resides may be fabricated of the same rigid yet relatively light material as shaft portion 50*b* as well as from steel. The swivel joint 16 may also include covers 62*a-b* and various hardware such as the snap rings 64*a-c*.

At one end of the swivel joint 16, the housing 48 has a surface 48*a* that operably attaches to one end of the tube 60 of the corresponding arm segment (arm segment 8 in the case of swivel joint 16). The housing 48 also has a shaft connecting portion 48*c* that operably connects the swivel joint 16 to the previous hinge joint (see FIGS. 1A-1D). In the case of swivel joint 16, the shaft connecting portion 48*c* connects the swivel joint 16 to the shaft of the hinge joint 14. At the other end of the swivel joint 16, the housing 49 has a surface 49*a* that operably attaches to a second end of the tube 60 of the corresponding arm segment (arm segment 8 in the case of swivel joint 16). The housing 49 also has a port 49*b* within which an end of the shaft assembly resides, particularly shaft portion 50*a*. Assembly of the tube 60 to the housing ends 48 and 49 is described in more detail below.

As may be best seen in FIG. 3B, at one end of the swivel joint 16, the inner diameter 65 of the port 48*b* of the housing 48 engages (e.g., fixedly attaches to) the outer diameter or outer race of the bearing 32. The port 48*b* of the housing 48 may, for example, be glued to the outer diameter or outer race of the bearing 32. The shaft portion 50*c*, for its part, has an outer diameter 67 that engages (e.g., is fixedly attached to) the inner diameter or inner race of the bearing 32. The shaft portion 50*c* may, for example, be glued to the inner diameter or inner race of the bearing 32. At the other end of the swivel joint 16, the inner diameter 69 of the port 49*b* of the housing 49 engages (e.g., fixedly attaches to) the outer diameter or outer race of the bearing 34. The port 49*b* of the housing 49 may, for example, be glued to the outer diameter or outer race of the bearing 34. The shaft portion 50*a*, for its part, has an outer diameter 71 that engages (e.g., is fixedly attached to) the inner diameter or inner race of the bearing 34. The shaft portion 50*a* may, for example, be glued to the inner diameter or inner race of the bearing 34. The shaft assembly 50, therefore, rotates about the axis of rotation a of the bearings 32 and 34 and the housings 48 and 49.

The PCB 36 of the swivel joint 16 has installed thereon at least one transducer configured to output an angle signal corresponding to an angle of rotation of the shaft assembly 50 relative to the housing 48, 49 about the axis of rotation a. Each transducer comprises an optical encoder that has two primary components, a read head 68 and the encoder disk 38. In one embodiment, two read heads 68 are positioned on PCB 36. In the illustrated embodiment, the encoder disk 38 is operably attached to an end of the shaft assembly 50 (e.g., using a suitable adhesive) spaced from and in alignment with read heads 68 on PCB 36, which is operably attached to the housing 48 (e.g., using a suitable adhesive). The locations of disk 38 and read heads 68 may be reversed whereby disk 38 may be operably attached to housing 48 and read heads 68 rotate with shaft assembly 50 so as to be rotatable with respect to each other while maintaining optical communication. Encoders are commercially available from, for example, Celera Motion under trade names such as MicroE encoders. Each PCB 36 may additionally include a processor for receiving and processing angle signals received from the read heads 68, and a transceiver and connector 93 for connecting the PCB 36 to the communication bus of the CMM 1 and/or other wiring as will be discussed hereinafter. Each of the PCB 36 may also include a temperature sensor connected to the processor to provide for thermal compensation due to room temperature variation.

The cover 62*b* operably attaches to the housing 48 to cover and seal the PCB 36 and encoder disk 38 from dust contamination. The cover 62*a* operably attaches over the cover 62*b* and portions of the housing 48 and tube 60 for cosmetic appearance. The cover 62*b* has the opening 63 from which the shaft connection portion 48*c* of the housing 48 protrudes to operably connect the swivel joint 16 to the hinge joint 14.

Swivel joint 16 (as well as other joints in CMM 1) may have unlimited rotation, meaning that it may rotate 360° about its axis of rotation a. Thus, slip ring 40 is used and provides unlimitedly rotatable electrical connections to swivel joint 16. Shafts used herein in swivel joints such as the shaft 30 of base swivel joint 12 and the shaft assembly 50 of swivel joint 16 may be hollow (i.e., have an axial opening 51). Shafts used herein in hinge joints such as the shaft 80 of hinge joint 18 described below may also be hollow and may also include an aperture 81 (see FIG. 5B). Back to FIGS. 3A and 3B, as illustrated, the housing cover 62*a* has the opening 63, the cover 62*b* has the opening 61, and the housing 48 has the opening 48*d* which aligns with the aperture 81 of the shaft 80 of the hinge joint 18. Thus, communication bus wiring may enter the swivel joint 16 from the aperture 81 of hinge joint 14, through the opening 48*d*, through the opening 63, the opening 61 and connect to PCB 36, which connects to the slip ring 40. From the slip ring 40, wiring may travel through the axial opening 51 of the shaft 50 to the next hinge joint. Such wiring is shown diagrammatically below.

Conventionally a shaft used in a joint for a coordinate measuring machine had one or more shoulders or flanges extending radially outwardly from the axis of the joint beyond the surface of the shaft that engages the inner diameter or inner race of the bearing. These shoulders or flanges were deemed necessary to retain the shaft axially in place in relation to the rest of the joint particularly the joint's bearings. Similarly, conventionally a housing used in a joint for a coordinate measuring machine had one or more shoulders or flanges extending radially inwardly towards the axis of the joint beyond the surface of the housing that engages the outer diameter or outer race of the bearing. These shoulders or flanges were deemed necessary to retain the housing axially in place in relation to the rest of the joint particularly the joint's bearings. See, for example, FIGS. 10, 12, 14, and 16 of U.S. Pat. No. 8,607,467 (which is hereby incorporated by reference in its entirety) in which both shafts and housings have shoulders or flanges to retain the shafts and housings axially in place in relation to the bearings.

These conventional shafts and housings were manufactured by machining in order to produce the shoulders or flanges. But even the most advanced machining processes were limited in the precision they could impart to such machined shafts and housings. These parts were, therefore, significantly limited by the precision of the machining process. This was a problem since, as discussed in the Background section of the present application, accuracy is important for coordinated measuring machines.

As best seen in FIG. 3B, the shaft portions 50a and 50c have no portion whose diameter is larger than the inner diameter or inner race of the bearings 32, 34. No portion of the shaft portion 50a has a larger diameter than the outer diameter 71, which engages the inner diameter or inner race of the bearings 34. No portion of the shaft portion 50c has a larger diameter than the outer diameter 67, which engages the inner diameter or inner race of the bearings 32. Similarly, the port 48b, which engages the outer diameter or outer race of the bearing 32, has no portion whose diameter is smaller or narrower than the outer diameter of the bearing 32. The port 49b, which engages the outer diameter or outer race of the bearing 34, has no portion whose diameter is smaller or narrower than the outer diameter of the bearing 34. Therefore, it may be said that the shaft assembly 50 and housings 48 and 49 are shoulderless as that term is defined herein. The shaft portions 50a and 50c have no portion extending radially outwardly from the axis a of the joint 16 beyond the surfaces 67, 71 that engage the inner diameters or inner races of the bearings 32, 34. Similarly, the housings 48, 49 have no portion extending radially inwardly towards the axis a of the joint 16 beyond the surfaces 65, 69 of the housings 48, 49, respectively, that engage the outer diameters or outer races of the bearing 32, 34.

Instead of shoulders or flanges, the shaft portions 50a and 50c may have grooves 72, 73 machined or otherwise formed thereon. The snap rings 64b-c may engage the grooves 72, 73 to retain the shaft assembly 50 axially in place in relation to the rest of joint 16 and the bearings 32, 34. Similarly, the housing 49 may have a groove 74 machined or otherwise formed thereon. The snap ring 64a may engage the groove 74 to retain the housing 49 axially in place in relation to the rest of joint 16 and the bearings 32, 34. In one embodiment, instead of or in addition to the combination of the grooves 72, 73 and the snap rings 64b-c to retain the shaft 50 axially in place in relation to the rest of joint 16 and the bearings 32, 34, the shaft 50 may be fixedly attached to the inner diameters or inner races of the bearings 32, 34 by use of an adhesive. Similarly, in one embodiment, instead of or in addition to the combination of the groove 74 and the snap ring 64a to retain the housing 49 axially in place in relation to the rest of joint 16 and the bearings 32, 34, the surface 71 of the housing 49 may be fixedly attached to the outer diameter or outer race of the bearing 34 by use of an adhesive.

Shoulderless shafts and housings such as those illustrated in FIGS. 3A and 3B may be manufactured by grinding and honing processes that may be an order of magnitude more precise than machining process used to manufacture the shouldered or flanged shafts and housings of the prior art. The shoulderless shafts and housings disclosed herein may thus be significantly more precisely built resulting in significant improvements in the precision of measurements that may be achieved at the joint 16 and similar joints of the CMM 1. In part because of the shoulderless shafts and housings disclosed herein, the CMM 1 achieves significantly better accuracy than prior art portable coordinate measurement machines.

The swivel joint 16 of arm segment 8 is a relatively long joint as compared to, for example, joint 14 as may be appreciated from FIGS. 1A-1D and 3A. The bearings 32 and 34 are located far apart. The shaft 50 has three parts, the middle portion 50b having end portions 50a and 50c attached to the ends of the middle portion 50b far apart from each other. The outer tube 60 is long with housing ends 48 and 49 spaced far apart from each other. Such relatively long joints, and particularly long joints with multi-portioned shafts, have conventionally not been able to be constructed such that joint rotation remains precise, particularly when compared to shorter, single-portion shaft, joints.

Figure 11A:
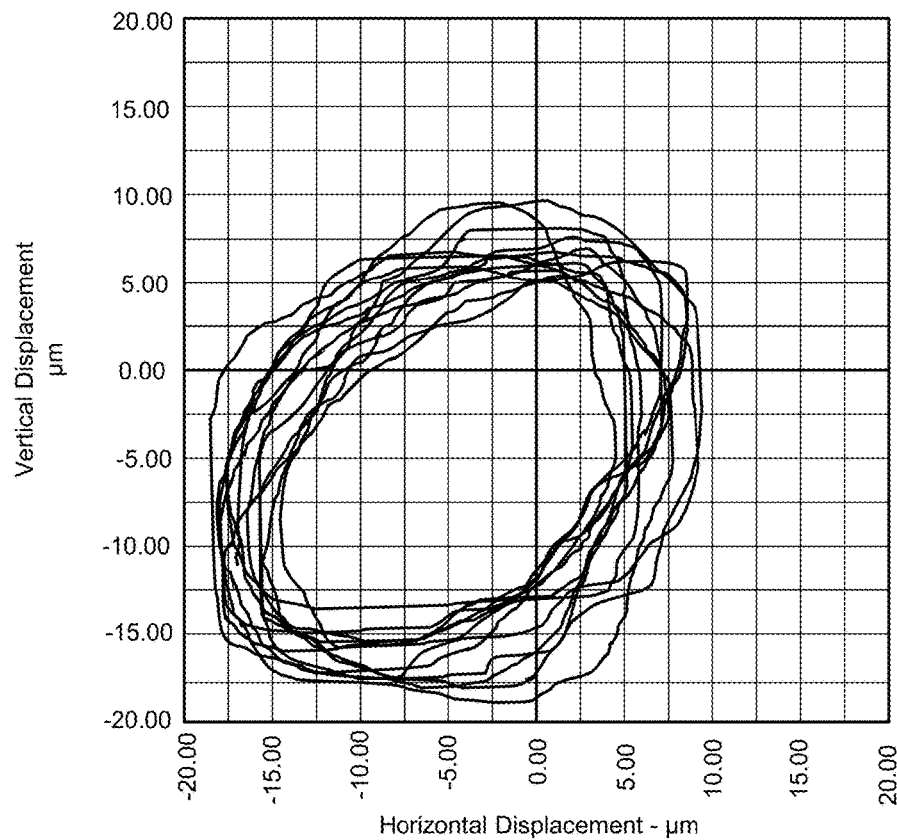
FIG. 11A illustrates an exemplary orbit plot showing rotation of a shaft for a conventional long arm joint.

FIG. 11A illustrates an orbit plot showing typical behavior of rotation of a conventional long arm's shaft measured as prescribed by Orton (P. A. Orton et al, *Automatic Self-Calibration of an Incremental Motion Encoder*, IEEE Instrument and Measurement Technology Conference, Budapest, Hungary, May 21-23, 2001, at 1614) incorporated here by reference in its entirety. The technique measures, not only angular position of the shaft, but also horizontal and vertical motion of the shaft. See also U.S. Pat. No. 5,596,189 issued on Jan. 21, 1997 incorporated here by reference in its entirety. Notice on the orbit plot of FIG. 11A that horizontal and vertical displacement of the conventional shaft during rotation is about 20 microns from center. Moreover, notice that the horizontal and vertical displacement of conventional shafts during rotation is non-circular and inconsistent from one rotation to the next, varying as much as approximately 5 microns. In actuality, horizontal and vertical displacement of conventional shafts (and particularly long, multi-portion shafts) during rotation is typically even larger than 20 microns from center, non-circular, and varies from rotation to rotation even more than 5 microns. This shaft displacement from center negatively affects accuracy of measurements taken by conventional coordinate measuring machines. At least part of the problem causing such undesirable displacement from center is that, up to this point, there has not been a process for constructing and assembling long, multi-portion shaft, joints with the required precision.

Figure 3C:
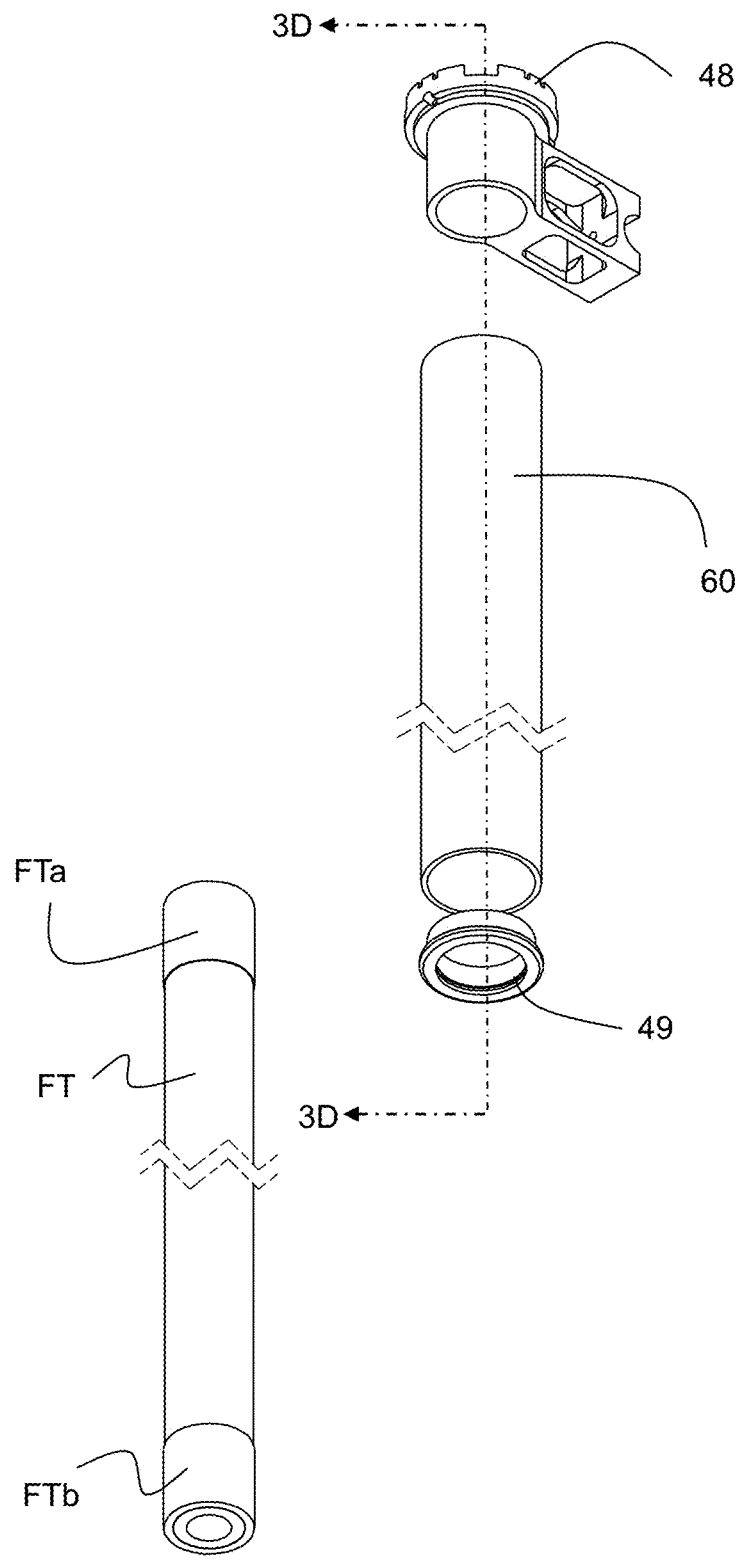
FIGS. 3C and 3D illustrate the process of assembling housing ends to the outer tube of the exemplary swivel joint.
Figure 3D:
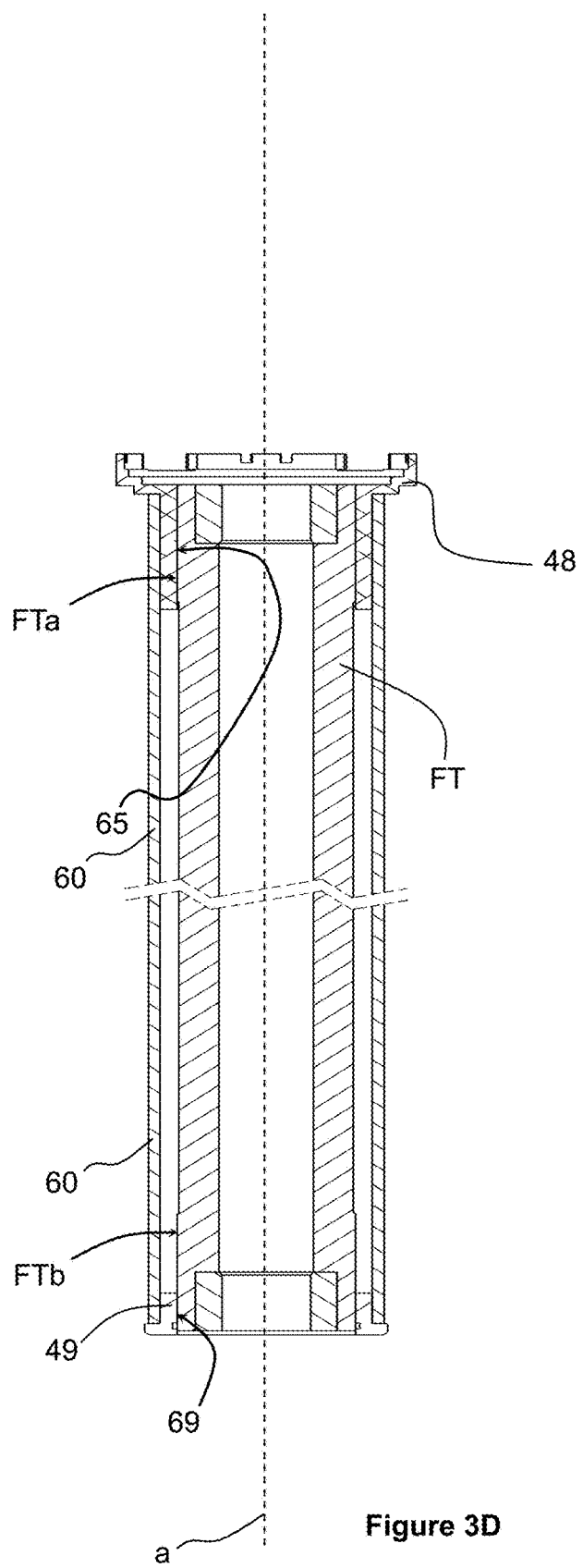

FIGS. 3C and 3D illustrate an exemplary process for assembling the outer tube 60 of the exemplary swivel joint 16 to the housing ends 48 and 49. As shown in FIG. 3C, a fixturing tube FT may be used to promote precision in assembling the outer tube 60 to the housing ends 48 and 49. The fixturing tube FT may, for example, be precisely grinded to near perfect dimensions so that it is cylindrical to within one tenths of thousands of an inch (0.0001"). Its outer diameter is concentric to within one tenths of thousands of an inch (0.0001"). The housing ends 48 and 49 may be glued to respective ends of the tube 60 and the fixturing tube FT may be used to precisely fix the housing ends 48 and 49 in place relative to each other while the glue cures. As seen in FIG. 3D (a halfway cross-sectional view), the housing ends 48 and 49 may be fixed to the tube 60 with the fixturing tube FT inside the assembly. The inner walls 65 and 69 of the housing ends 48 and 49 may be made to fit tightly (very tightly, almost interference) against the walls FTa and FTb of the very precise fixturing tube FT. Once the glue has cured, the fixturing tube FT may be removed from the assembly. The fixturing tube FT may be oiled to aid in its removal. Using this process, the housing ends 48 and 49 may be made to be concentric (i.e., their inner diameters share the same axis a) to within five tenths of thousands of an inch (0.0005"). Other methods that may be used to achieve similar results may include internal grinding of the housing ends 48 and 49 once affixed to the assembly including the tube 60.

Figure 3E:
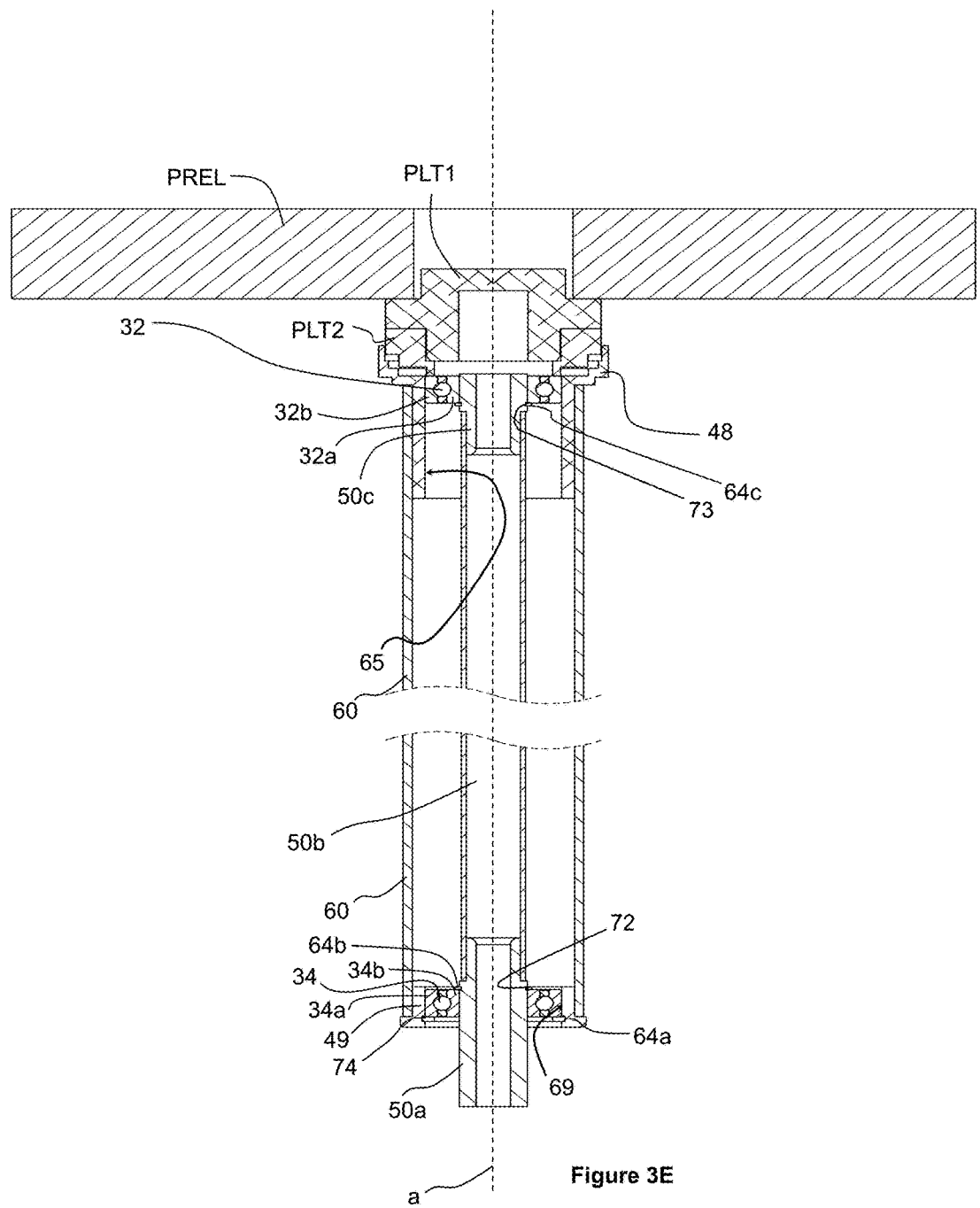
FIG. 3E illustrates the process of assembling the shaft and bearings to the outer tube of the exemplary swivel joint.

FIG. 3E illustrates an exemplary process for assembling the shaft assembly 50 and the bearings 32 and 34 to the assembly including the outer tube 60 and the housing ends 48 and 49.

First, as described above, the shaft ends 50a and 50c may be attached to the shaft portion 50b to form the shaft assembly 50. To promote precision, the shaft ends 50a and 50c may be first machined oversized by a few thousands of an inch. That is, the shaft ends 50a and 50c may be first made to be wider (larger outer diameter) than their final desired diameter. The shaft ends 50a and 50c may then be glued to the two ends of the long shaft portion 50b using, for example, v-blocks on a granite table. Next the shaft assembly 50 may be grinded at the two ends 50a and 50c so that the two ends are concentric (i.e., their outer diameters share the same axis a) to within one tenth of thousands of an inch (0.0001").

The inner snap rings 64b and 64c may be installed to shaft assembly 50 at grooves 72 and 73, respectively. The inner races or inner diameters 32a and 34a of the bearings 32 and 34 may be press fitted to the shaft assembly 50 until they are against snap rings 64b and 64c and glued to the shaft assembly 50. Outer snap ring 64a may be installed to the end housing 49 at the groove 74. The assembly including the shaft assembly 50 and the bearings 32 and 34 may be inserted into the assembly including the tube 60 and the end housings 48 and 49. Glue may be used to adhere the outer races 32b and 34b of the bearings 32 and 34 to the inner diameters 65 and 69 of the end housings 48 and 49. Then a preload (e.g., 5 or 10 lb weight) may be applied to the outer race 32b of bearing 32 to remove play between the inner and outer races of the bearings 32 and 34. In FIG. 3E, the preload PREL is applied to the outer race 32b of bearing 32 using the preload application tools PLT1 and PLT2, which ensure that the preload is applied only to the outer race 32b and not the inner race 32a. The preload PREL is applied to the outer race 32b until the glue has cured and then removed. Application of the preload PREL results in removing play from the bearing assembly.

Conventional processes for constructing and assembling long (and particularly multi-portion shaft) joints did not allow for the precision necessary to effectively preload the bearings to remove play, which caused excessive horizontal and vertical displacement of the conventional shaft during rotation. Attempts to preload such imprecise conventional long joints to remove play would result in either excessive deformation of the bearings, jamming, grinding, excessive wear, etc. (i.e., the joints would not be usable or perform unsatisfactorily) or insufficient preloading resulting in excessive shaft displacement from center during rotation.

Figure 11B:
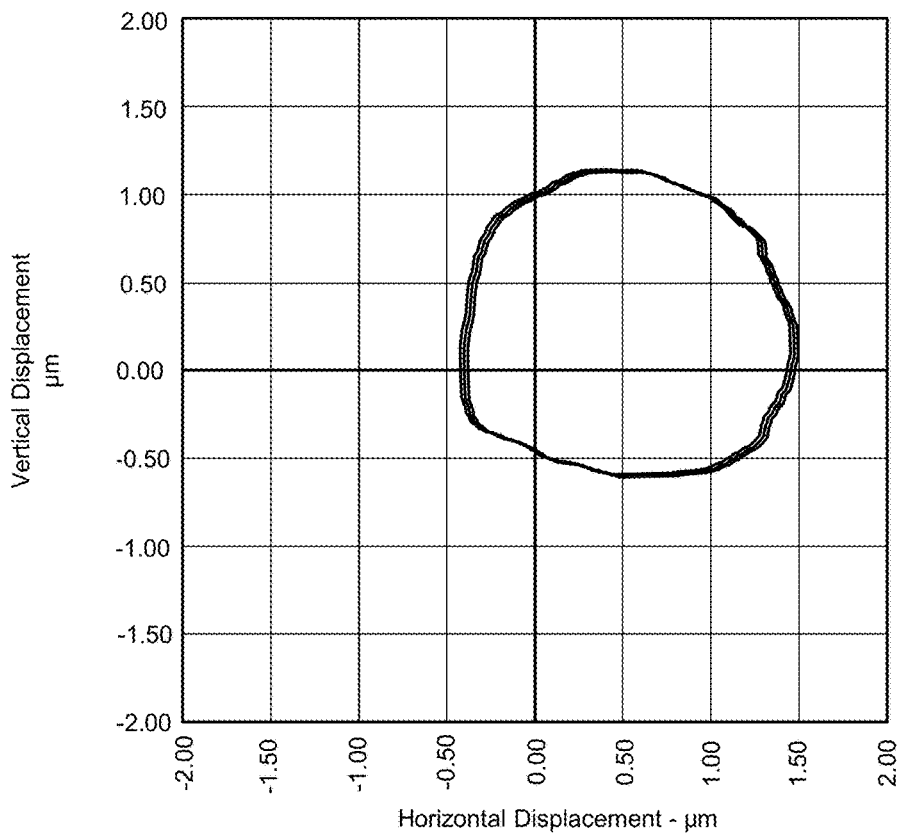
FIG. 11B illustrates an exemplary orbit plot showing rotation of a shaft for a long arm joint of the CMM of the present disclosure.

FIG. 11B illustrates an orbit plot showing typical behavior of rotation of a long arm 8 including the multi-portion shaft joint 16 as measured as prescribed by Orton. Notice that, on the orbit plot of FIG. 11B, horizontal and vertical displacement of the shaft 50 during rotation has been significantly reduced to within 1.5 microns from center. Moreover, notice that the horizontal and vertical displacement of the shaft 50 during rotation is remarkably circular and consistent from one rotation to the next. This is a significant improvement from the measured displacement exemplarily shown on FIG. 11A for the conventional long joint. This significant improvement in displacement from center drastically improves accuracy of measurements taken by the CMM 1 when compared to conventional coordinate measuring machines. The process described above for constructing and assembling the long joint 16 including the multi-portion shaft 50 provides the required precision to achieve such significant improvements.

Figure 4:
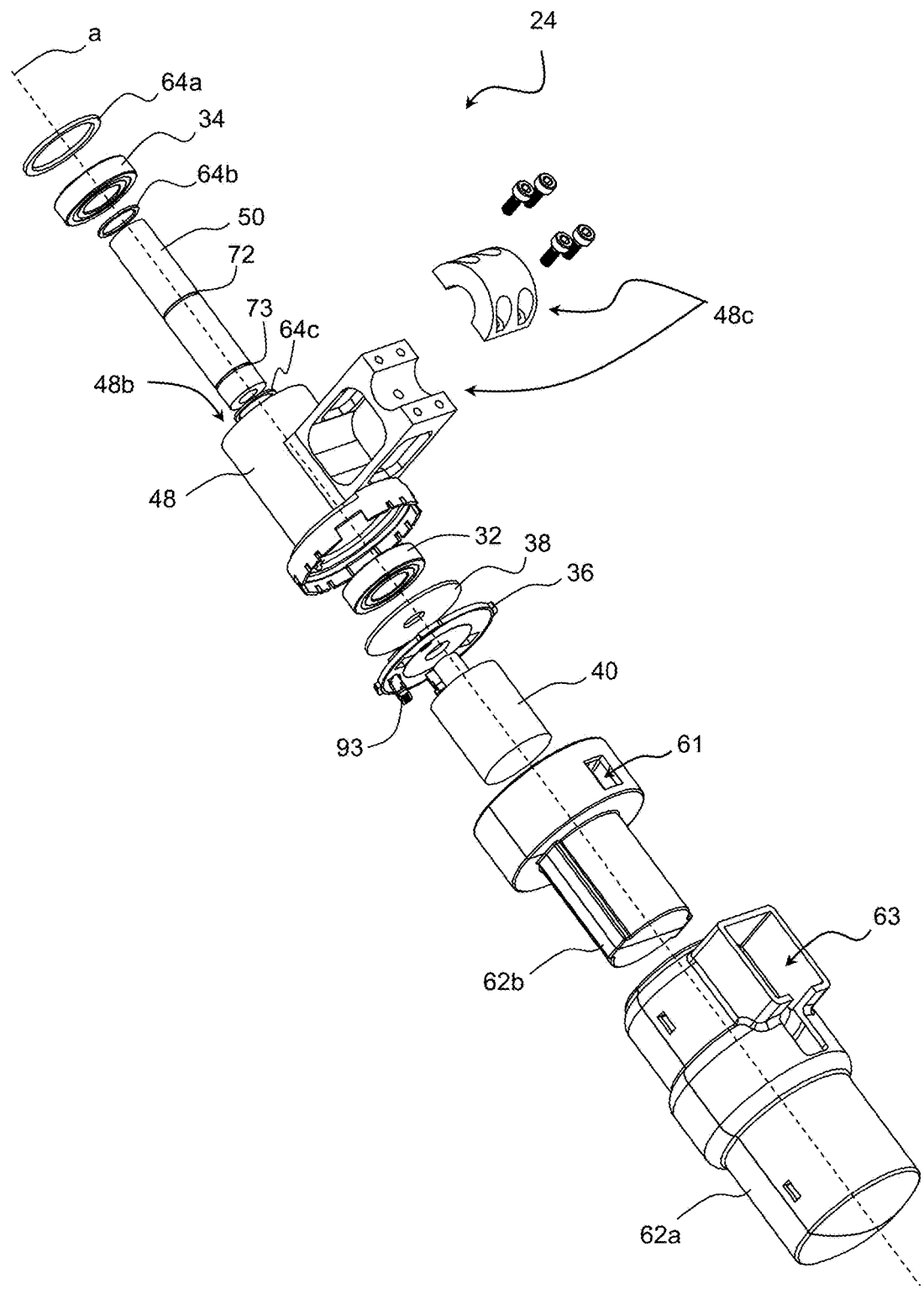
FIG. 4 illustrates an exploded view of an exemplary swivel joint of the CMM of FIGS. 1A-1D.

FIG. 4 illustrates an exploded view of an exemplary swivel joint 24. Swivel joint 24 is similar to swivel joints 16 and 20 described above except that swivel joint 24 has a shorter shaft 50 whose length corresponds to the distance between swivel joint 24 and probe 6 being shorter than the distance between, for example, swivel joint 16 and hinge joint 18. Thus, the probe 6 rotates about the axis a of the swivel joint 24 and the swivel joint 24 detects the angle of rotation of the probe 6, which is attached to the end of the swivel joint 16. See FIGS. 1A-1D.

Figure 5A:
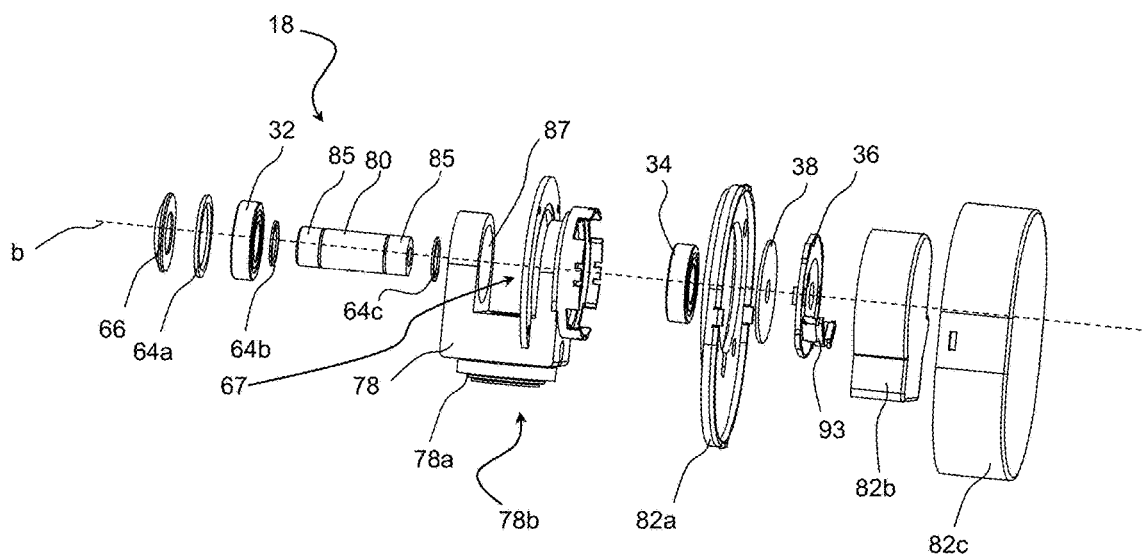
FIGS. 5A and 5B illustrate exploded and cross-sectional views, respectively, of a hinge joint of the CMM of FIGS. 1A-1D.
Figure 5B:
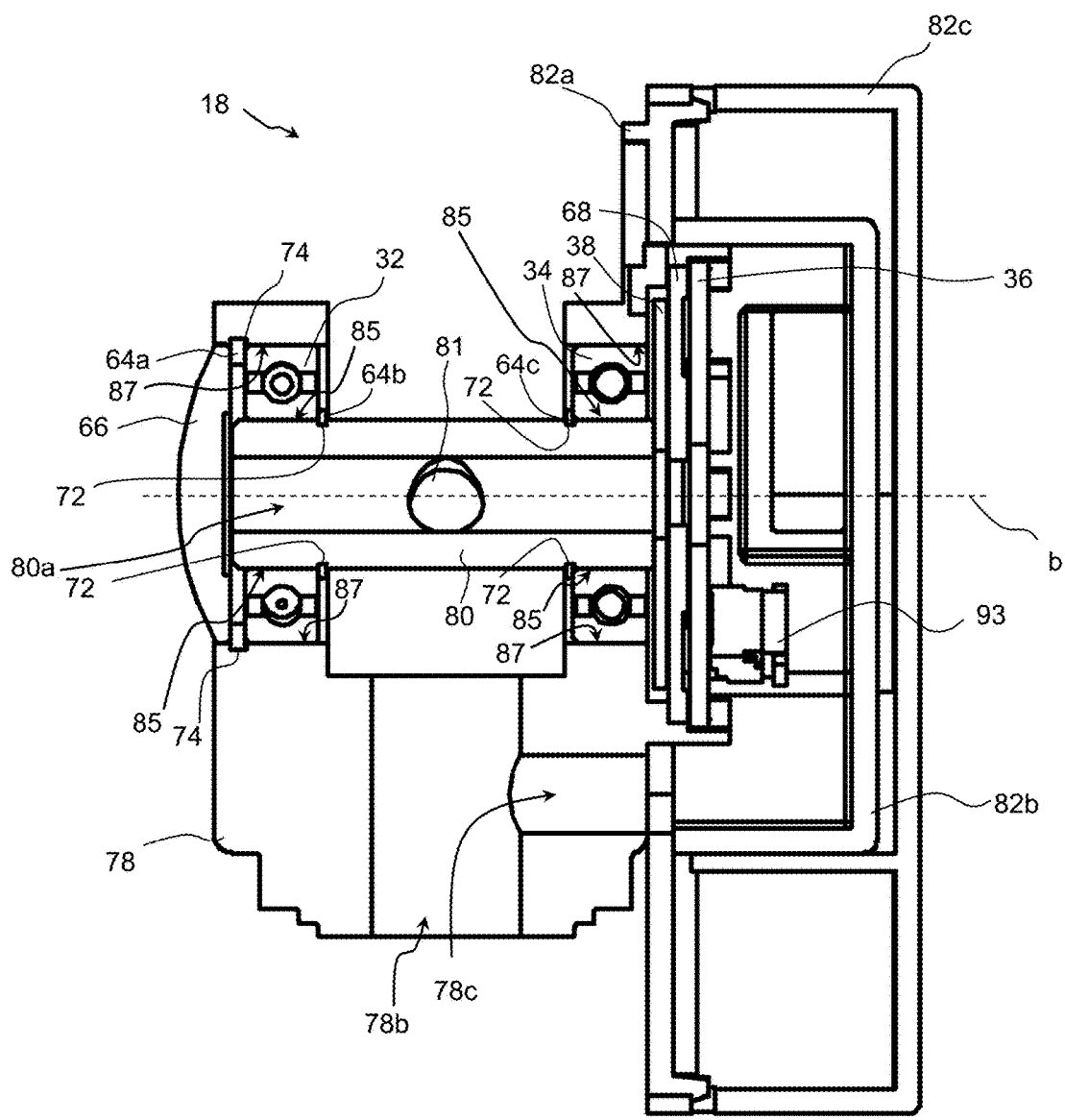

FIG. 5A illustrates an exploded view of exemplary hinge joint 18 while FIG. 5B illustrates a cross-sectional view of hinge joint 18. The hinge joint 18 will be used here to describe hinge joints 14, 18, 22 in general even though the hinge joints may not be identical. At least some of the components of hinge joint 18 are substantially similar to components discussed in detail above in reference to swivel joints 12 and 16 and thus these similar components are identified in FIGS. 5A and 5B with the same reference designators as in the previous figures.

The hinge joint 18 may include housing 78, shaft 80, bearings 32, 34, encoder PCB 36, and encoder disk 38. The housing 78 has an opening 78b to which the shaft of the previous swivel joint (shaft 50 of swivel joint 16 in the case of hinge joint 18) connects. The hinge joint 18 may also include covers 82a-c and various hardware such as the snap rings 64a-c and cap 66.

As may be best seen in FIG. 5B, the housing 78 has ports 87 that engage (e.g., fixedly attach to) the outer diameters or outer races of the bearings 32, 34. The ports 87 of the housing 78 may, for example, be glued to the outer diameter or outer race of the bearings 32 and 34. In the embodiment of FIGS. 5A and 5B the housing 78 has two ports 87. The shaft 80, for its part, has an outer diameter 85 that engages (e.g., is fixedly attached to) the inner diameter or inner race of the bearings 32, 34. The shaft 80 may, for example, be glued to the inner diameter or inner race of the bearings 32, 34. The shaft 80, therefore, rotates about the axis of rotation b of the bearings 32 34 and the housing 78 of the hinge joint 18.

Similar to the swivel joints discussed above, the PCB 36 of the hinge joint 18 has installed thereon at least one transducer configured to output an angle signal corresponding to an angle of rotation of the shaft 80 relative to the housing 78 about the axis of rotation b. Each transducer comprises an optical encoder that has two primary components, a read head 68 and the encoder disk 38. In the illustrated embodiment, two read heads 68 are positioned on PCB 36. In the illustrated embodiment, the encoder disk 38 is operably attached to an end of the shaft 80 (e.g., using a suitable adhesive) spaced from and in alignment with read heads 68 on PCB 36, which is operably attached to the housing 78 (e.g., using a suitable adhesive). The locations of disk 38 and read heads 68 may be reversed whereby disk 38 may be operably attached to housing 78 and read heads 68 rotate with shaft 80 so as to be rotatable with respect to each other while maintaining optical communication.

The cover 82b operably attaches to the housing 78 to cover and seal the PCB 36 and encoder disk 38 from dust. The covers 82a and 82c operably attach to each other at one end of the shaft 80 and the cap 66 caps to the opposite end of the shaft 80 to protect the bearings.

Communications bus wiring may enter the hinge joint 18 from the axial opening 51 of the shaft 50 of the previous swivel joint through the openings 78b, 78c of the housing 78. The wiring may then connect to the PCB 36 and depart the hinge joint 18 through the axial opening 80a and the aperture 81 of shaft 80. Such wiring is shown diagrammatically below.

As discussed above, conventionally a shaft used in a joint for a coordinate measuring machine had one or more shoulders or flanges extending radially outwardly from the axis of the joint beyond the surface of the shaft that engages the inner diameter or inner race of the bearing. These shoulders or flanges were deemed necessary to retain the shaft axially in place in relation to the rest of the joint particularly the joint's bearings. Similarly, conventionally a housing used in a joint for a coordinate measuring machine had one or more shoulders or flanges extending radially inwardly towards the axis of the joint beyond the surface of the housing that engages the outer diameter or outer race of the bearing. These shoulders or flanges were deemed necessary to retain the housing axially in place in relation to the rest of the joint particularly the joint's bearings. See, for example, FIGS. 10, 12, 14, and 16 of U.S. Pat. No. 8,607,467 in which both shafts and housings have shoulders or flanges to retain the shafts and housings axially in place in relation to bearings.

These conventional shafts and housings were manufactured by machining in order to produce the shoulders or flanges. But even the most advanced machining processes were limited in the precision they could impart to such machined shafts and housings. These parts were limited by the precision of the machining process and, as discussed in the Background section of the present application, accuracy is important for CMM.

As best seen in FIG. 5B, the shaft 80 has no portion whose diameter is larger than the inner diameter or inner race of the bearings 32, 34. No portion of the shaft 80 has a larger diameter that the outer diameter 85, which engages the inner diameters or inner races of the bearings 32, 34. Similarly, the ports 87, which engage the outer diameters or outer races of the bearings 32, 34, have no portion whose diameter is smaller or narrower than the outer diameter of the bearing 32 or the outer diameter of the bearing 34. Therefore, it may be said that the shaft 80 and housing 78 are shoulderless as defined herein i.e., 1) the shaft 50 has no portion extending radially outwardly from the axis b of the joint 18 beyond the surface 85 of the shaft 80 that engages the inner diameters or inner races of the bearing 32, 34, and 2) the housing 78 has no portion extending radially inwardly towards the axis b of the joint 18 beyond the surface 87 of the housing 78 that engages the outer diameters or outer races of the bearing 32, 34.

Instead of shoulders or flanges, the shaft 80 may have grooves 72 machined or otherwise formed thereon. The snap rings 64b-c may engage the grooves 72 to retain the shaft 80 axially in place in relation to the rest of joint 18 and the bearings 32, 34. Similarly, the housing 78 may have a groove 74 machined or otherwise formed thereon. The snap ring 64a may engage the groove 74 to retain the housing 78 axially in place in relation to the rest of joint 18 and the bearings 32, 34. In one embodiment, instead of or in addition to the combination of the grooves 72 and the snap rings 64b-c to retain the shaft 80 axially in place in relation to the rest of joint 18 and the bearings 32, 34, the shaft 80 may be fixedly attached to the inner diameters or inner races of the bearings 32, 34 by use of an adhesive. Similarly, in one embodiment, instead of or in addition to the combination of the groove 74 and the snap ring 64a to retain the housing 78 axially in place in relation to the rest of joint 18 and the bearings 32, 34, the ports 87 of the housing 78 may be fixedly attached to the outer diameters or outer races of the bearings 32, 34 by use of an adhesive.

Shoulderless shafts and housings such as those illustrated in FIGS. 5A and 5B may be manufactured by grinding and honing processes that may be an order of magnitude more precise than machining process used to manufacture the shouldered or flanged shafts and housings of the prior art. The shoulderless shafts and housings disclosed herein may thus be significantly more precisely built resulting in significant improvements in the precision of measurements that may be achieved at the joint 18 and similar joints of the CMM 1. In part because of the shoulderless shafts and housings disclosed herein, the CMM 1 achieves significantly better accuracy than prior art portable coordinate measurement machines.

Joints for prior art coordinate measurement machines were manufactured mostly of aluminum or other lightweight materials. See, for example, U.S. Pat. No. 8,607,467 which discloses a coordinate measurement machine in which joints are constructed of cast or machined aluminum components, lightweight stiff alloy or composite, or fiber reinforced polymer. The reference makes clear that relatively low weight is very important for the proper functionality of the disclosed coordinate measurement machine. A problem with such prior art coordinate measurement machines was that their aluminum (or similarly lightweight material) construction, which has a significantly different thermal expansion coefficient from that of the joint's bearings, causes variation in the joint's rigidity over temperature. This reduces accuracy of measurements taken over the operating temperature range.

The present invention takes an approach that may seem counterintuitive. In one embodiment, structural elements of the joints of the arm 2 may be fabricated of steel matching the material from which the bearings 32, 34 are fabricated. Structural elements in this context refer to housings 28, 48, 49, and 78, shafts 30, 50, and 80, and shaft portions 50a and 50c. These are the structural elements that are in contact with the inner or outer race of the ball bearings 32, 34. The housing 48 also attaches a swivel joint to the next hinge joint. Steel in this context includes stainless steel and has a thermal expansion coefficient in the range of between of 9.9 to 18 μm/m° C. at 25° C. The use of relatively heavy steel for the structural elements of the joints of the arm 2 may seem somewhat counterintuitive because, as discussed above, one of the important features of the CMM 1 is that it must be lightweight. Steel is significantly heavier that the materials used by prior art coordinate measurement machines such as aluminum. Structural elements matching the material (i.e., steel) from which the bearings 32, 34 are fabricated, however, would have the same (or nearly the same) thermal expansion coefficient (i.e., would expand or contract with temperature at the same rate) as the bearings 32, 34. This minimizes variation in the joint's rigidity over temperature and thus maintains accuracy of measurements taken over the operating temperature range of the CMM 1.

In another embodiment, structural elements of the joints of the arm 2, other structural elements such as shaft portion 50b, tubes 60, etc. and even non-structural elements of the CMM 1 may be fabricated of a controlled expansion alloy lighter in weight than steel but having a thermal expansion coefficient matching that of chrome steel or 440C stainless steel (i.e., in the range of between of 9.9 to 18 μm/m° C. at 25° C.). A commercially available example of such controlled expansion alloy is Osprey CE sold by Sandvik AB of Sandviken, Sweden. Structural elements fabricated from materials matching the thermal expansion coefficient (i.e., would expand or contract with temperature at the same rate) of the bearings 32, 34 minimize variation in the joint's rigidity over temperature and thus maintain accuracy of measurements taken over the operating temperature range of the CMM 1. The significantly thinner arm segments 8 and 9 fabricated from rigid yet relatively light material such as, for example, carbon fiber or controlled expansion alloy combined with structural elements (and even non-structural elements) fabricated from controlled expansion alloy result in a CMM 1 that is significantly lighter and significantly more accurate over the operating temperature range than prior art coordinate measuring machines.

Figure 6A:
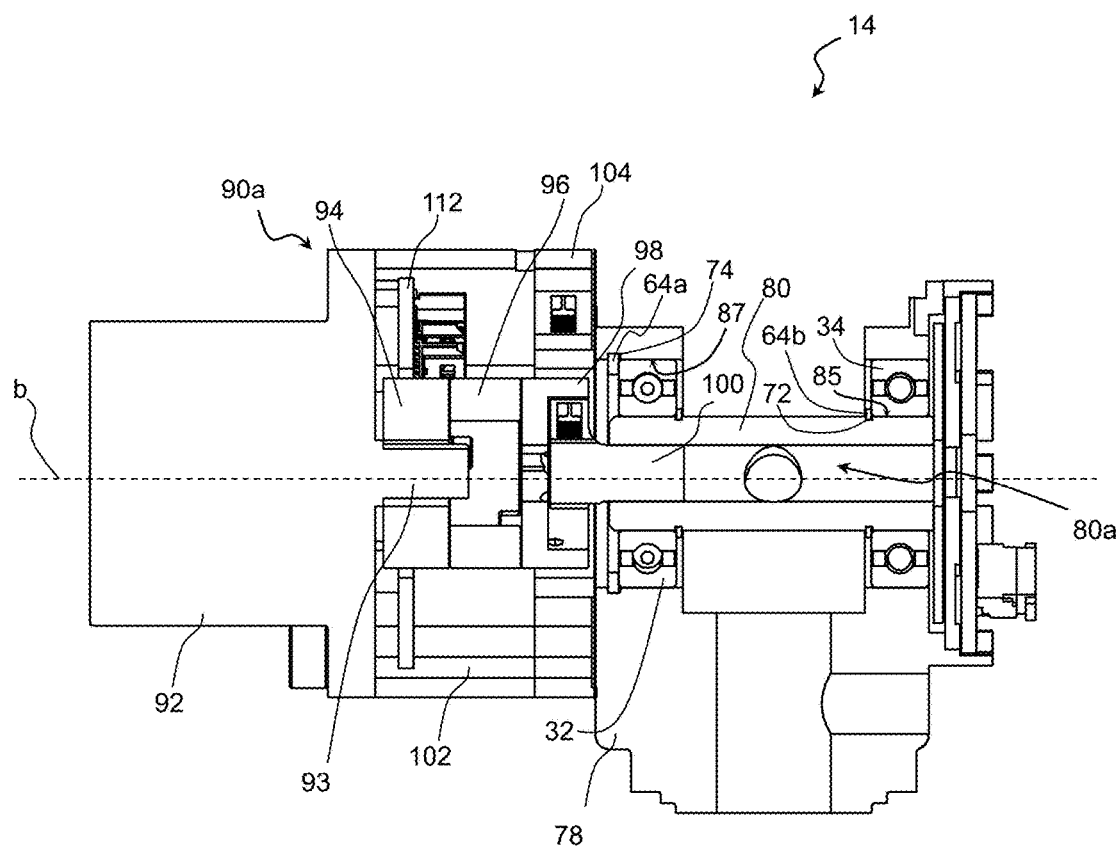
FIG. 6A illustrates a cross-sectional view of an exemplary hinge joint of the CMM of FIGS. 1A-1D including a rotary damper.

FIG. 6A illustrates a cross-sectional view of exemplary hinge joint 14. Hinge joint 22 is very similar to hinge joint 18 described above. Hinge joint 14 is also similar to hinge joints 18 and 22, a significant difference being that the hinge joint 14 includes a rotary damper assembly. In the illustrated embodiment of FIG. 6A, the rotary damper assembly is an instrumented assembly 90a as described in detail below. To ease the use of the arm 2, a counter balance arrangement in the form of the rotary damper assembly 90a may be provided to offset the torque applied by the weight of the articulated arm. The counter balance prevents the articulated arm 2 from falling down rapidly due to its own weight if the user releases it.

Conventionally, portable coordinate measuring machines used coil springs or torsion springs to counter balance the weight of the arm. See, for example, U.S. Pat. Nos. 6,904,691 and 8,001,697 each of which is hereby incorporated by reference in their entirety. Another conventional counter balance systems included a piston or linear actuator assembly forming a gas shock counterbalance. See, for example, U.S. Pat. No. 8,402,669 which is hereby incorporated by reference in its entirety. Each of these conventional counter balance solutions had problems with adjustment and calibration of the counter balance. Also, these conventional counter balance solutions were generally bulky and heavy, two undesirable characteristics for portable coordinate measuring machines.

Figure 6B:
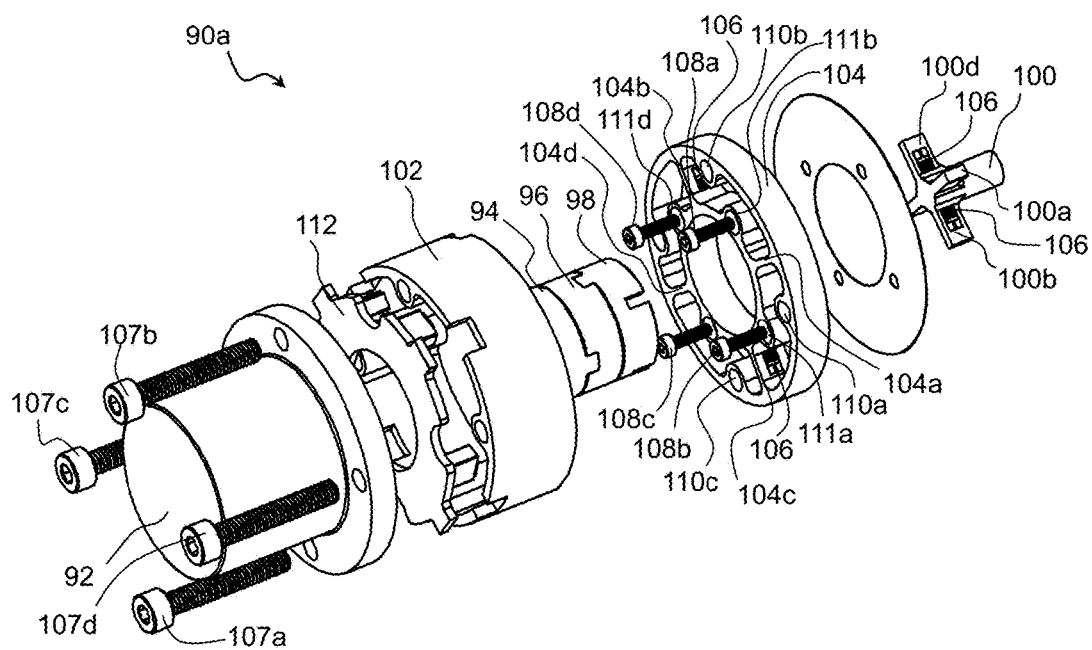
FIG. 6B illustrates an exploded view of an exemplary instrumented rotary damper assembly of the CMM of FIGS. 1A-1D.

FIG. 6B illustrates an exploded view of the exemplary rotary damper assembly 90a. The assembly 90a includes the rotary damper 92 which may be a commercially available rotary damper such as WRD dampers manufactured by Weforma Dampfungstechnik GmbH of Stolberg, Germany. In one embodiment, the rotary damper 92 is a unidirectional rotary damper that provides controlled damping of rotational movement of the shaft about the axis of rotation in one direction of rotation. The assembly 90a may also include damper hub 94, damper sleeve 96, and torque sensor shaft hub 98, which together form an Oldham coupling. The assembly 90a may also include torque sensor shaft 100. The assembly 90a may also include spacer 102, mount 104, and hardware such as bolts 107a-d and 108a-d. The mount 104 has four threaded apertures 110a-d and four non-threaded apertures 111a-d.

As best seen in FIG. 6A, the damper assembly 90a comes together by first coupling a portion of the torque sensor shaft 100 to the shaft 80 of the hinge joint 14. A portion of the torque sensor shaft 100 may be inserted in and fixedly attached to (e.g., by using adhesive) the axial opening 80a of the shaft 80. The mount 104 is coupled to the housing 78 of the hinge joint 14 by inserting the bolts 108a-d through the apertures 111a-d and threading them into threaded openings in the housing 78. The rest of the components of the rotary damper assembly 90a are then stacked in order: the shaft hub 98 on the shaft 100, the damper sleeve 96 on the shaft hub 98, the damper hub 94 on the damper sleeve 96, and the damper hub 94 on the shaft 93 of the rotary damper 92. The spacer 102 is sandwiched between the rotary damper 92 and the mount 104 by threading the bolts 107a-d to the threaded apertures 110a-d of the mount 104. Thus, the rotary damper 92 is operably coupled to the shaft 80 and the housing 78.

The rotary damper 92 provides controlled damping of rotational movement of the shaft 80 about the axis of rotation b. The amount of torque output to control damping provided by the rotary damper 92 may be preadjusted and precalibrated to tight specifications. Thus, the rotary damper assembly 90a alleviates problems with adjustment and calibration of counter balance that were typical to conventional counter balance solutions for portable coordinate measuring machines such as coil springs, torsion springs, and pistons. Also, the rotary damper assembly 90a provides a counter balance solution that is generally more compact and lighter in weight when compared to conventional counter balance solutions such as coil springs, torsion springs, and pistons.

A potential issue that arises, particularly with use of a rotary damper to provide controlled damping of rotational movement, is that a user may apply excessive torque to the arm 2 when moving it. The excessive force may effectively bend portions of the arm 2 affecting the ability of the CMM 1 to accurately detect the position of the measurement probe 6. Measurements taken under these conditions, in which the user essentially moves the arm too fast, may be inaccurate. The present disclosure provides two potential solutions to this potential issue.

In the embodiment of FIGS. 6A and 6B, the rotary damper assembly 90a is instrumented to directly detect excessive torque at the joint 14. The mount 104 has webbing or spokes 104a-d that connect the outer ring of the mount 104 which include the threaded apertures 110a-d to the inner ring of the mount 104 which include the non-threaded apertures 111a-d. Installed on at least some of the spokes 104a-d are strain gauges 106. Similarly, the torque sensor shaft 100 has webbing or spokes 100a-d that connect it to the torque sensor shaft hub 98. Installed on at least some of the spokes 100a-d are strain gauges 106. The rotary damper assembly 90a also includes a torque sensor PCB 112 which has installed thereon electronics that receive signals from the strain gauges 106.

Torque applied to the joint 14 is transmitted through the spokes 100a-d and 104a-d. Such torque manifests itself as rotational strain on the spokes 100a-d and 104a-d. Thus, by measuring strain at the spokes 100a-d and 104a-d, the gauges 106 effectively sense strain at the shaft 80 and the housing 78 of the joint 14 due to the rotational movement of the shaft 80 about the axis of rotation b. In that sense, the strain gauges 106 are operably coupled to the shaft 80 and the housing 78. The strain gauges output strain signals that circuitry in the PCB 112 or another circuit (e.g., the processor in the corresponding joint's PCB 36) in or external to the CMM 1 may use to detect and account for torque applied to the joint 14.

Strain measured by the gauges 106 corresponds to an amount of torque applied to the joint 14. The measured strain, thus, also corresponds to an amount of bending or flexing of portions of the arm 2. The measured strain, therefore, may be correlated to an amount and nature of bending or flexing of the arm 2 and that information, in turn, may be taken into account when taking measurements with the CMM 1 to compensate for excessive torque. Thus, in this instrumented embodiment of the rotary damper assembly 90, an electrical circuit in the PCB 112 (or the processor in the corresponding joint's PCB 36 that receives the angle signals from the read heads 68) may receive the strain signals (or amplified strain signals) from the strain gauges 106, convert those signals to corresponding bending or flexing of the arm 2 due to torque applied to the arm 2, and calculate the measurement at the measurement probe 6 taking into account the corresponding bending or flexing of the arm 2. For example, the PCB 112 may include amplifiers to amplify the analog signals from the strain gauges 106 and analog to digital converters to convert the amplified analog signals to digital signals that may be provided to a processor of the PCB 36 of the corresponding joint. The processor may look up on a table or calculate an amount and direction of bending or flexing of the arm 2 corresponding to the location and amplitude of the measured strain. Therefore, by measuring strain at the spokes 100*a-d* and 104*a-d*, the CMM 1 can accurately detect the position of the measurement probe 6 regardless of a user applying excessive torque to the arm 2.

In an alternative embodiment, when any of the strain signals or an agglomeration of the strain signals exceeds a certain strain threshold, a determination may be made that too much torque has been applied to the joint 14. Based on that determination, the CMM 1 may disable the taking of measurements until after a certain amount of time (e.g., two to ten seconds) has passed. This is to allow for any portions of the arm 2 that may have bent due to the excessive applied torque to return to its original shape.

Figure 6C:
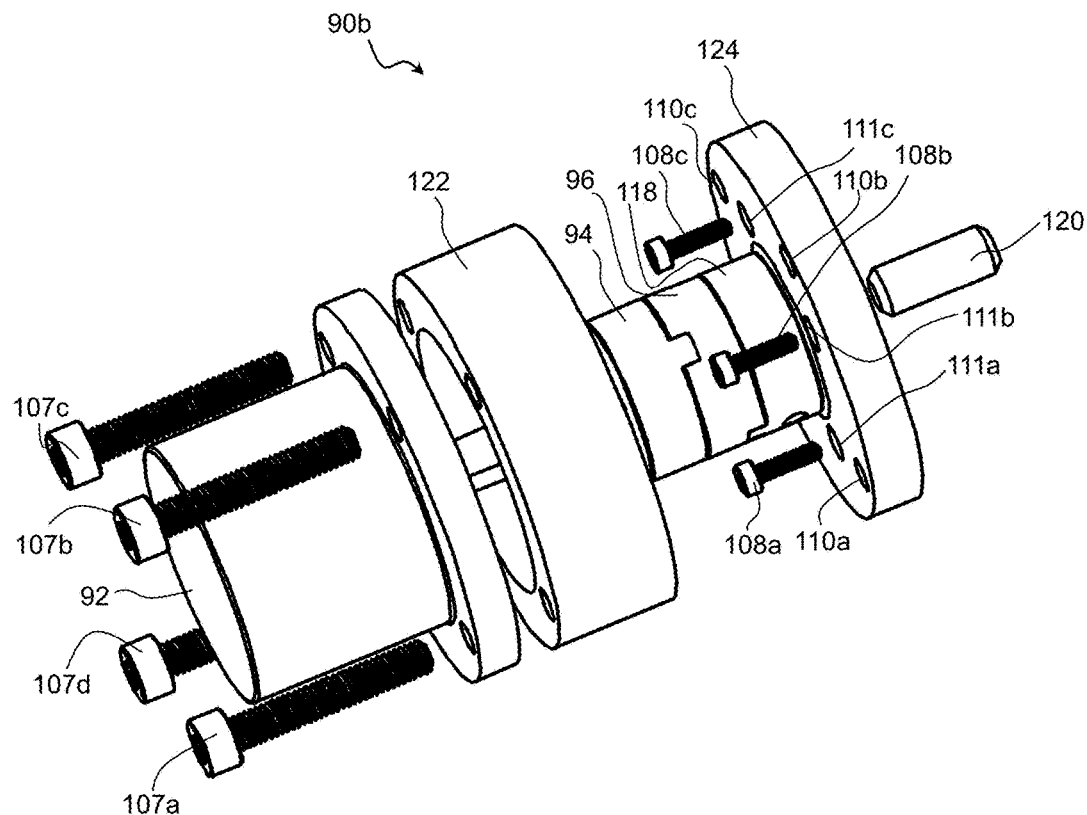
FIG. 6C illustrates an exploded view of an exemplary non-instrumented rotary damper assembly of the CMM of FIGS. 1A-1D.

FIG. 6C illustrates an exemplary non-instrumented rotary damper assembly 90*b*. Unlike the rotary damper assembly 90*a* of FIGS. 6A and 6B, the rotary damper assembly 90*b* is not instrumented to directly detect excessive torque. In this embodiment, the angle signal output by the read heads 68 may be used to generate a speed signal that may be used as a proxy for applied torque. Torque applied to the arm 2 to move it generally corresponds to the speed at which the arm 2 moves. As stated above, excessive torque applied to the arm 2 essentially corresponds to the user moving the arm too fast, at too much speed. Therefore, excessive applied torque may be indirectly detected at the joints in the form of relatively high (i.e., too high) rotational speed. The read heads 68 output the angle signal that corresponds to the relative angle of rotation of the joint. The rate at which the measured angle of rotation changes corresponds to the rotational speed of the joint. Detecting the rotational speed at the joint is a good proxy for detecting applied torque. In this embodiment, the angle signal output by the read heads 68 may be used to generate a speed signal by calculating the rate at which the measured angle of rotation changes, the speed signal. A processor in the PCB 36 (or anywhere else) may measure the speed signal (e.g., degrees per second) using a high resolution timer (e.g., 12.5 ns resolution) measuring the period of one of the encoder's quadrature signals. When the speed signal exceeds a certain rotational speed threshold, a determination is made that too much torque has been applied. Based on that determination, the CMM 1 may disable the taking of measurements until after a certain amount of time (e.g., two to ten seconds) has passed. This is to allow for any portions of the arm 2 that may have bent due to the excessive applied torque to return to its original shape.

The assembly 90*b* is similar to assembly 90*a* of FIGS. 6A and 6B. The assembly 90*b* may include the rotary damper 92. The assembly 90*b* may also include the damper hub 94, damper sleeve 96, shaft hub 118 (together forming an Oldham coupler), and shaft 120. The assembly 90*b* may also include spacer 122, mount 124, and hardware such as bolts 107*a-d* and 108*a-d*. The spacer 122 is similar to the spacer 102 except that it does not need to hold the PCB 112. The mount 124 has four threaded apertures 110*a-d* and four non-threaded apertures 111*a-d*. The mount 124 is similar to the mount 104 except that it does not need the webbing or spokes 104*a-d*.

The damper assembly 90*b* comes together by first coupling a portion of the torque sensor shaft 120 to the shaft 80 of the hinge joint 14. A portion of the torque sensor shaft 120 may be inserted in and fixedly attached to (e.g., by using adhesive) the axial opening 80*a* of the shaft 80. The mount 124 is coupled to the housing 78 of the hinge joint 14 by inserting the bolts 108*a-d* through the apertures 111*a-d* and threading them into threaded openings in the housing 78. The rest of the components of the rotary damper assembly 90*b* are then stacked in order: the shaft hub 118 on the shaft 120, the damper sleeve 96 on the shaft hub 118, the damper hub 94 on the damper sleeve 96, and the damper hub 94 on the shaft 93 of the rotary damper 92. The spacer 122 is sandwiched between the rotary damper 92 and the mount 124 by threading the bolts 107*a-d* to the threaded apertures 110*a-d* of the mount 124. Thus, the rotary damper 92 is operably coupled to the shaft 80 and the housing 78.

In one embodiment (not shown), instead of an add-on rotary damper assembly such as the assemblies 90*a* and 90*b*, rotary damping is built into the hinge joint 18. In this embodiment, a combination of a) the first bearing 32 or the second bearing 34 with b) the shaft 80 or the housing 78 provides controlled damping of rotational movement of the shaft 80 about the axis of rotation b.

Figure 7A:
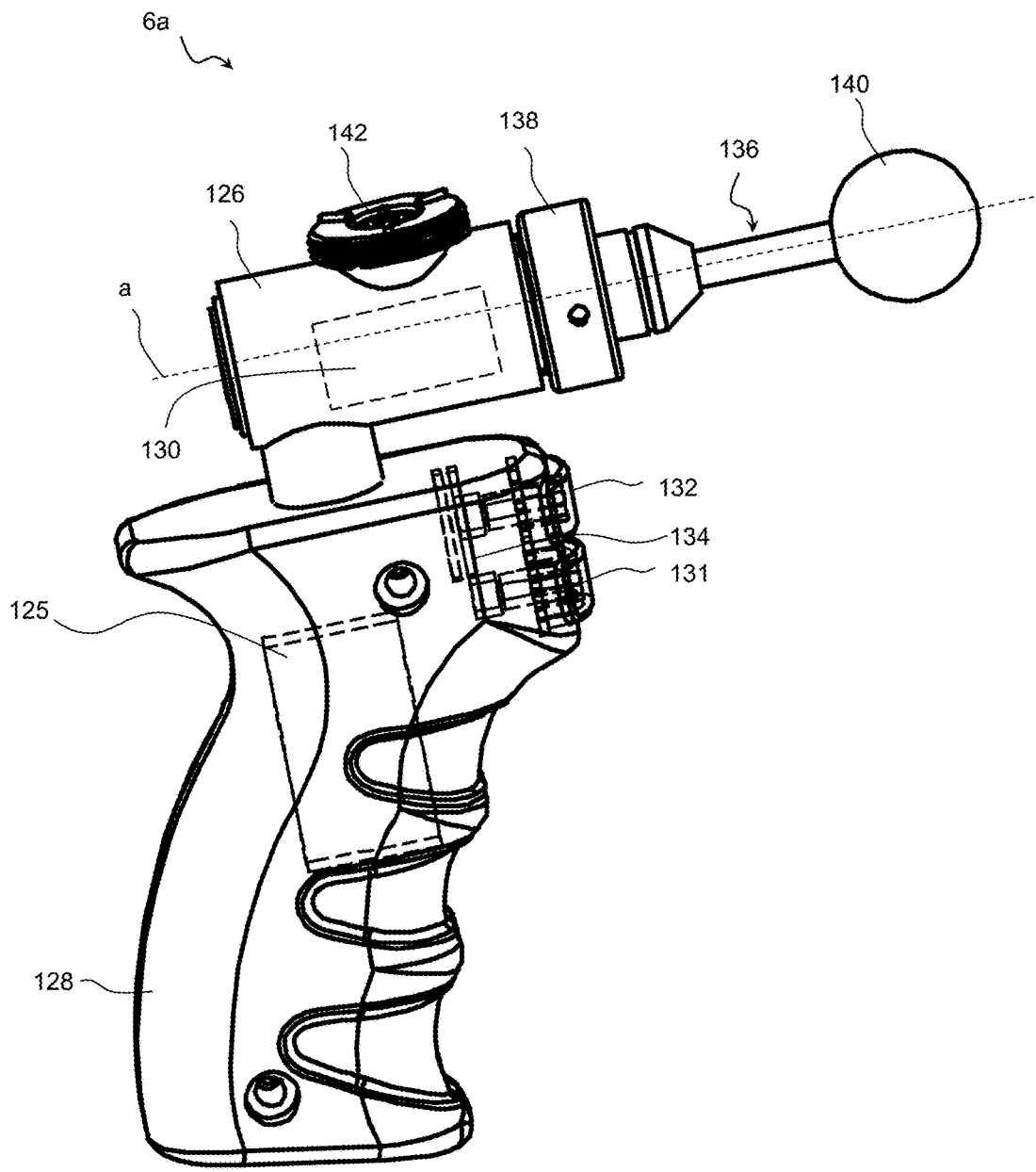
FIG. 7A illustrates a perspective view of an exemplary measurement probe of the CMM of FIGS. 1A-1D.

FIG. 7A illustrates a perspective view of an exemplary measurement probe 6*a*. Probe 6*a* includes a housing 126 that has an interior space for housing PCB 130 and a handle 128 that has an interior space for housing PCB 125. The housing 126 and the handle 128 are shown in FIG. 7A transparent for illustration purposes. Housing 126 operably couples to the swivel joint 24 (see FIGS. 1A-1D). Thus, the probe 6*a* rotates about the axis a of the swivel joint 24 and the swivel joint 24 detects the angle of rotation of the probe 6*a* about the axis a.

The measurement probe 6*a* may also include a probe stem assembly 136 having a probe connector 138 at one end and a probe 140 at the other end. The probe connector 138 connects to the housing 126 and the PCB 130. The probe stem assembly 136 may be a touch trigger assembly which triggers the capture of the position of the probe 140 when the probe 140 touches an object. The PCB 130 receives such a trigger signal and transmits it as described below. The probe stem assembly 136 may also house electronics such as, for example, an integrated circuit (e.g., EEPROM) having stored therein a serial number to uniquely identify a probe stem assembly 136 upon installation to the CMM 1.

Handle 128 may include two switches, namely a take switch 131 and a confirm switch 132. These switches may be used by the operator to take a measurement (take switch 131) and to confirm the measurement (confirm switch 132) during operation. The handle 128 is generally shaped to resemble a person's grip, which is more ergonomic than at least some prior art probes. The handle 128 may also house a switch PCB 134 to which the switches 131 and 132 may mount. Switch PCB 134 is electrically coupled to PCB 125 hosting components for processing signals from the switches 131 and 132. In one embodiment, the PCB 125 includes a wireless (e.g., Wi-Fi, Bluetooth, etc.) transmitter (instead of an electrical connection to the communication bus of the CMM 1) that wirelessly transmits take and confirm signals associated with the switches 131 and 132 to, for example, a host PC that generally controls the CMM 1. Wireless transmission of the take and confirm signals associated with the switches 131 and 132 significantly simplifies construction and wiring of the probe 6a.

The measurement probe 6a may also include an option port 142 to which optional devices such as, for example, a laser scanner (not shown) may be connected. The option port 142 provides mechanical connections for the optional devices to be supported by the measurement probe 6a. The option port 142 may also provide electrical connections for the optional devices to interface with the communication bus of the CMM 1.

Figure 7B:
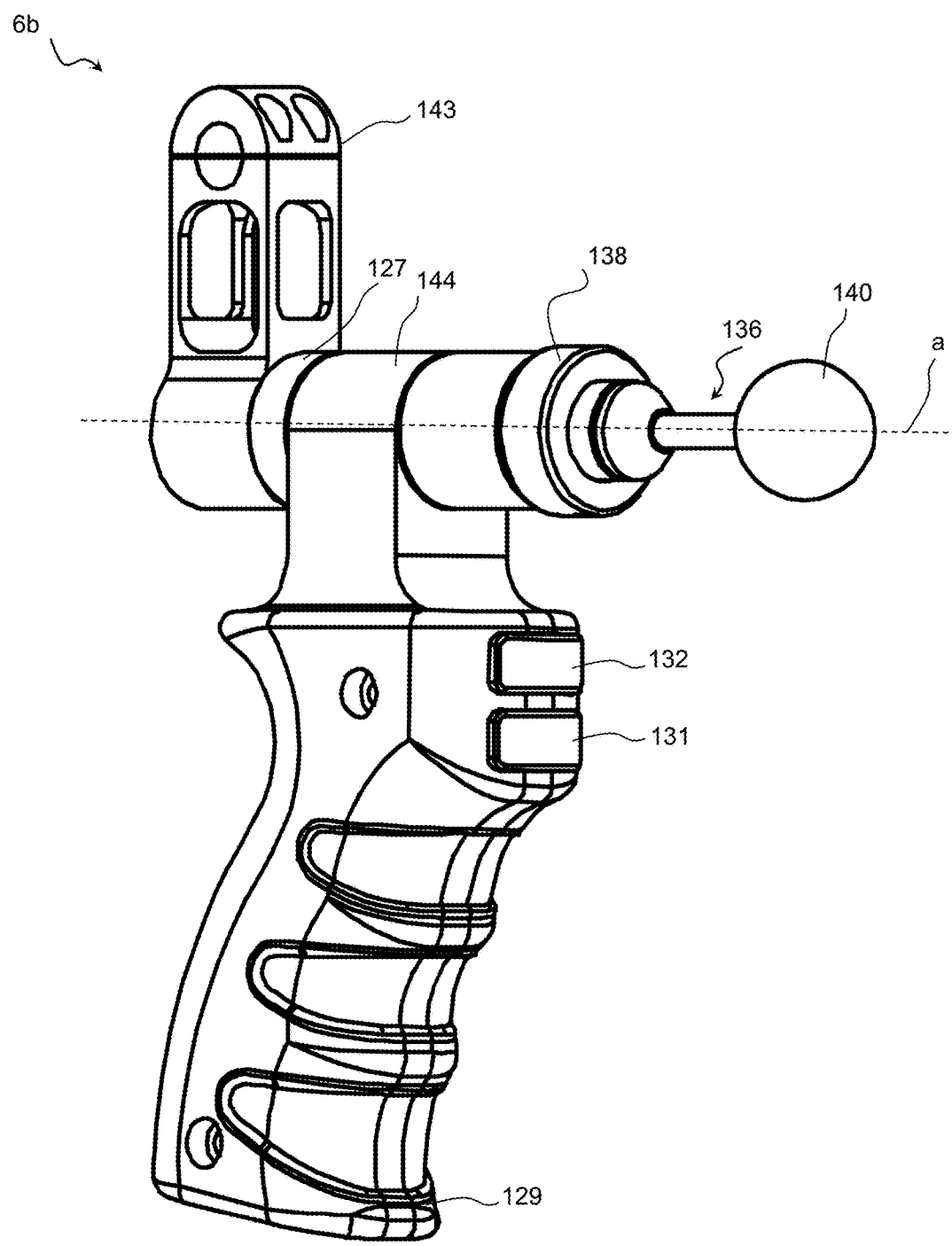
FIG. 7B illustrates a perspective view of an exemplary alternative measurement probe of the CMM of FIGS. 1A-1D.

FIG. 7B illustrates a perspective view of an exemplary alternative measurement probe 6b. The probe 6b is similar to the probe 6. The probe 6b, however, includes a different housing 127 and handle 129. Unlike the probe 6, the housing 127 of the probe 6b includes a connecting portion 143 that may connect directly to the hinge joint 22. Thus, when the probe 6b is used, the swivel joint 24 is not used. The housing 127 and the probe stem assembly 136 do not rotate about the axis a. The housing 127 and the probe stem assembly 136 are fixed about the axis a. The handle 129, on the other hand, includes a connecting portion 144 that rotatably couples the handle 129 to the housing 127. Thus, the handle 129 rotates about the axis a. Like the handle 128 of probe 6, the handle 129 has an interior space for housing PCB 125. The PCB 125 may include a wireless (e.g., Wi-Fi, Bluetooth, etc.) transmitter (instead of an electrical connection to the communication bus of the CMM 1) that wirelessly transmits signals such as, for example, take and confirm signals associated with the switches 131 and 132. Thus, the handle 129 is rotatably coupled to the arm 2 to rotate about the axis a but, importantly, the handle 129 is not electrically coupled to the arm 2 because signal transmission is accomplished wirelessly.

The probe 6b is a significant advance in the coordinate measuring machine field because it alleviates the need for seven true axes of rotation. The CMM 1 as illustrated in FIGS. 1A-1D include seven true axes of rotation (i.e., axes associated with joints 12, 14, 16, 18, 20, 22, and 24). Including seven true axes of rotation results in a relatively more complex and expensive CMM 1. The rotatable handle 129, mechanically and wirelessly (but not electrically) connected to the arm 2 and thus not requiring the seventh joint 24, alleviates the need for a "true" seventh axis because it permits the handle 129 to rotate as needed for hand position without the complexity of a seventh set of bearings, transducers, electronics, etc.

Figure 8:
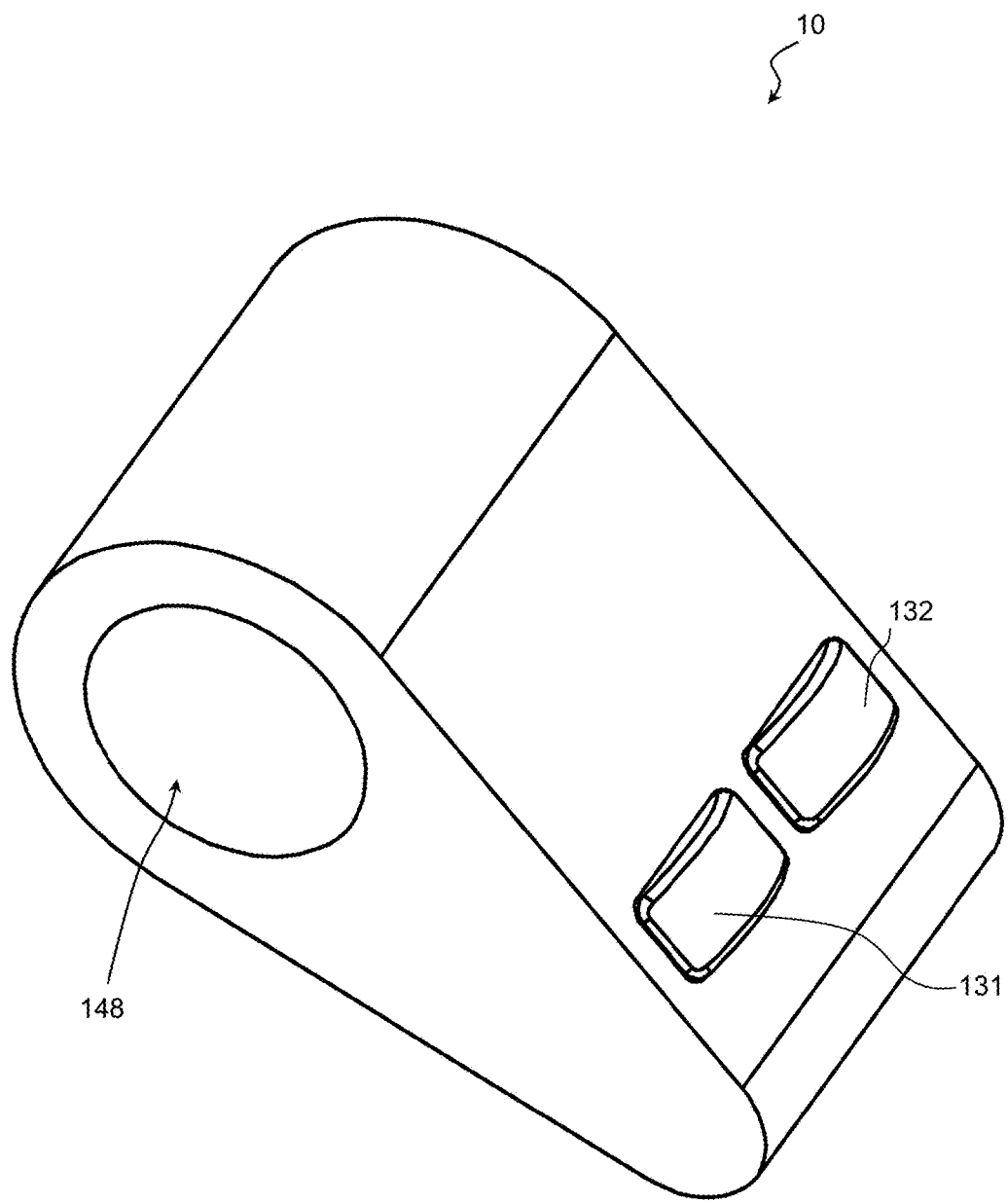
FIG. 8 illustrates a perspective view of an exemplary on-arm switch assembly of the CMM of FIGS. 1A-1D.

FIG. 8 illustrates a perspective view of an exemplary on-arm switch assembly 10. Switch assembly 10 includes a housing 146 that has opening 148 to mount (e.g., clamp) the switch assembly 10 to the arm segment 8 or, alternatively to the arm segment 9. The housing 146 has an interior space for housing a PCB. Similar to the probes 6 and 6b, the switch assembly 10 may include two switches, namely a take switch 131 and a confirm switch 132 that may be used by the operator to take a measurement (take switch 131) and to confirm the measurement (confirm switch 132) during operation. The position of the on-arm switch assembly 10, and more importantly of the switches 131 and 132, on the arm 2 instead of in the handles of the probe 6 allow for the operator to move and position the measurement probe 6 with one hand and to actuate the switches 131 and 132 with the other hand while supporting the arm. Prior art coordinate measurement machines required operators to position the measurement probe and actuate measurement switches in the probe with the same hand. This is not ergonomic. The on-arm switch assembly 10 is a significant advance in the coordinate measuring machine field because it provides a significantly more ergonomic solution as compared to prior art coordinate measurement machines.

The on-arm switch assembly 10 may also house a switch PCB 134 to which the switches 131 and 132 may mount or the on-arm switch assembly 10 may include a PCB that incorporates the functionality of both PCB 130 and switch PCB 134. In one embodiment, the PCB in the on-arm switch assembly 10 electrically connects to the communication bus of the CMM 1. In another embodiment, the PCB in the on-arm switch assembly 10 includes a wireless (e.g., Wi-Fi, Bluetooth, etc.) transmitter (instead of an electrical connection to the communication bus of the CMM 1) that wirelessly transmits take and confirm signals associated with the switches 131 and 132.

Figure 9:
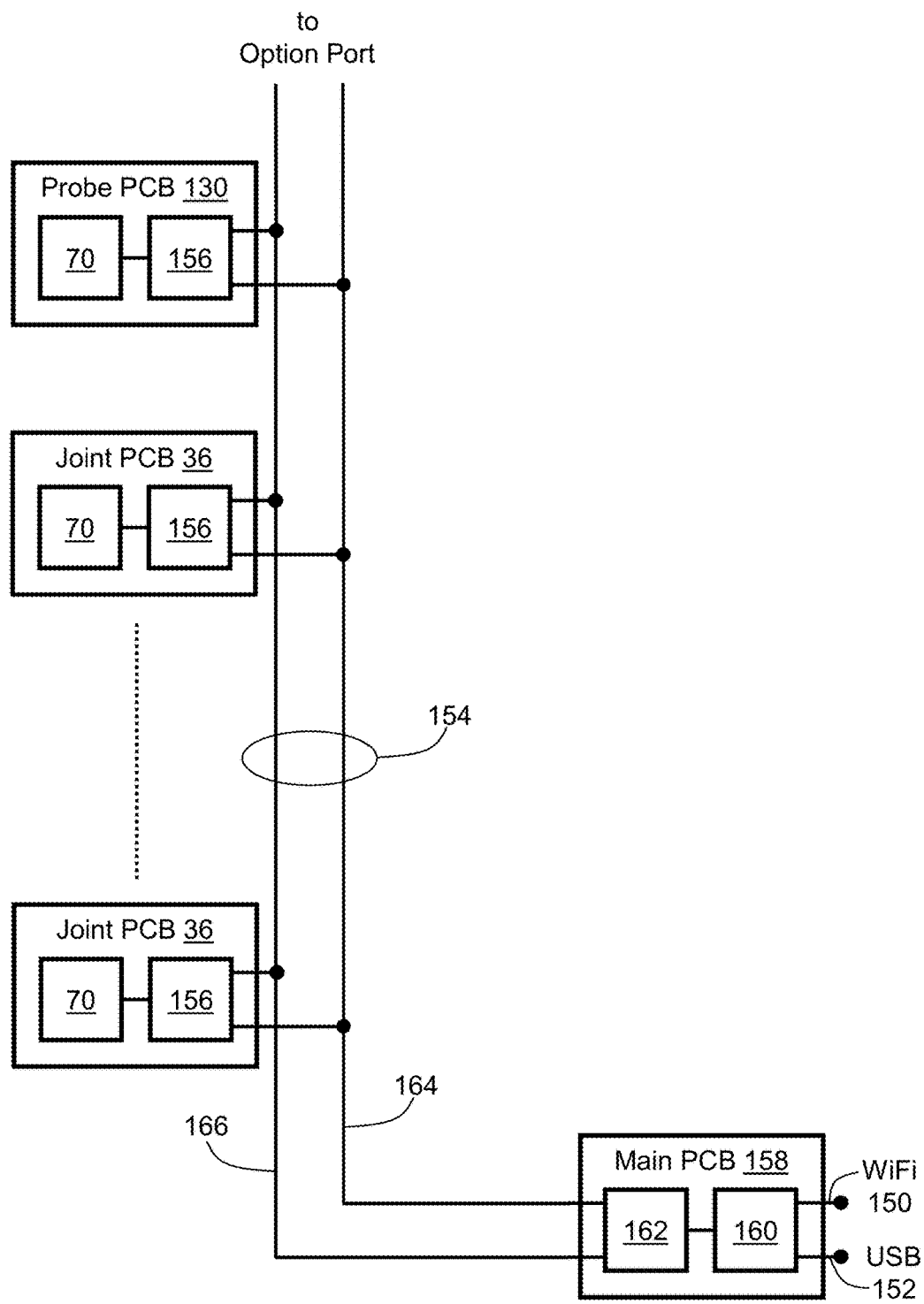
FIG. 9 illustrates a block diagram of exemplary electronics for the CMM of FIGS. 1A-1D.

FIG. 9 illustrates a block diagram of exemplary electronics for the CMM 1. The CMM 1 may include external communication interfaces such as a Universal Serial Bus (USB) 150 and wireless (Wi-Fi) 152. The CMM 1 may also include an internal communication bus (e.g., RS-485) 154. As discussed above, the various joints or axis of the CMM 1 each includes a PCB 36 which has installed thereon at least one transducer configured to output an angle signal corresponding to an angle of rotation of the joint. The PCB 36 may each include a processor 70 for receiving and processing angle signals from the transducers and/or strain signals from the PCB 112 of the rotary damper assemblies 90. The PCB 36 may also include a transceiver 156 to interface with the bus 154. The PCB 130 of the measurement probe 6, which may carry signals from the touch trigger probe 140, may also connect to the communication bus 154. The bus 154 may also connect to the option port 142 of the measurement probe 6 to communicate/control optional devices such as, for example, a laser scanner installed to the option port 142. The PCB 125 of the handle 128 may wirelessly transmit take and confirm signals associated with the switches 131 and 132.

The bus 154 terminates at a main PCB 158 preferably located at the base 4 of the CMM 1. The main PCB 158 includes its own main processor 160 and transceiver 162 for connecting to the bus 154. The main PCB 158 receives the angle signals from the transducers in the CMM 1 and output an agglomeration of the received angle signals via the USB 150 or the Wi-Fi 152 to a host PC such that the host PC may calculate the position of the measurement probe 6 based on this information and other information relating to the CMM 1 (e.g., location, length of arm segments, etc.) The internal bus 154 may be consistent with RS485.

Prior art coordinate measuring machines configured to use an RS485 internal bus incorporated dedicated capture and trigger wires to transport capture and trigger signals, respectively. See, for example, U.S. Pat. No. 6,219,928, which is hereby incorporated by reference in its entirety. A capture signal is a synchronous signal generated by a master controller in the RS485 arrangement. A trigger signal is an asynchronous signal that is generated by devices attached to the articulated arm such as a touch trigger probe accessory (e.g., Renishaw TP20). The dedicated trigger wire travels from the probe to the master controller in the base of the articulated arm. The trigger signal that travels through the dedicated trigger wire interrupts the master controller. An interrupt service routine in the master controller generates a synchronous capture signal to capture angle signals from the encoders Note that in FIG. 9 there are no dedicated capture or trigger wires. Instead the bus 154 includes, from the main PCB 158's point of view, a pair of bidirectional wires 164 and 166 (A-B Pair, half duplex) or two pairs of unidirectional wires (A-B Pair and Y-Z pair, full duplex).

Even with the use of steel for the structural elements of the joints as described above, the arm 2 remains relatively lightweight partly because many of its components (e.g., shafts, bearings, housings, arm segments, etc.) are smaller than those of prior art coordinate measuring machines. Compare, for example, the shafts, housings, and arm segments of the CMM 1 disclosed herein to corresponding elements of the coordinate measuring machines disclosed in U.S. Pat. No. 8,607,467. The smaller components of the CMM 1 have significantly less mass and are, thus, significantly lighter than their prior art counterparts. Smaller components may be used in the CMM1 in part because the amount of wires to carry signals within the CMM 1 has been significantly reduced when compared to prior art coordinate measuring machines. Prior art coordinate measuring machines needed significant space within shafts, housings, arm segments, etc. to route wires. Because of the arrangement of the electronics as described in FIG. 9 and the timing signals as described below, wiring may be significantly reduced in the CMM 1, which contributes to its light weight.

Figure 10A:
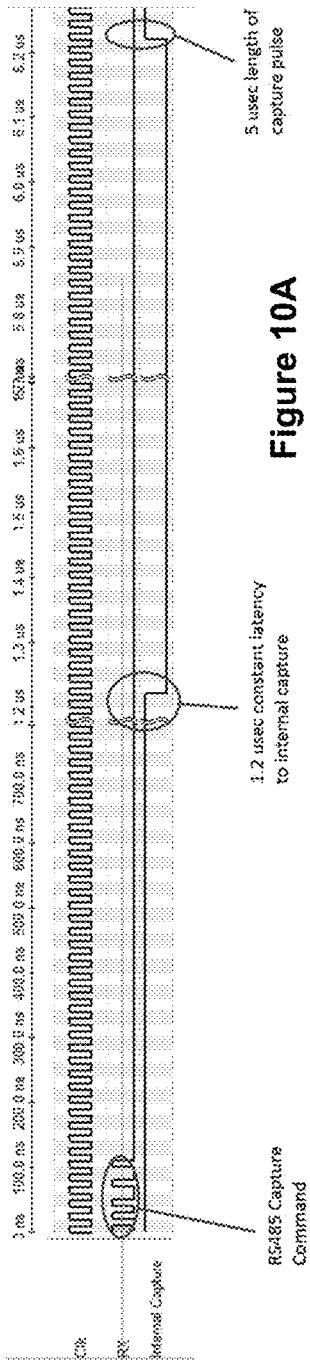
FIGS. 10A-10F illustrate timing diagrams of exemplary electronics for the CMM of FIGS. 1A-1D.
Figure 10B:
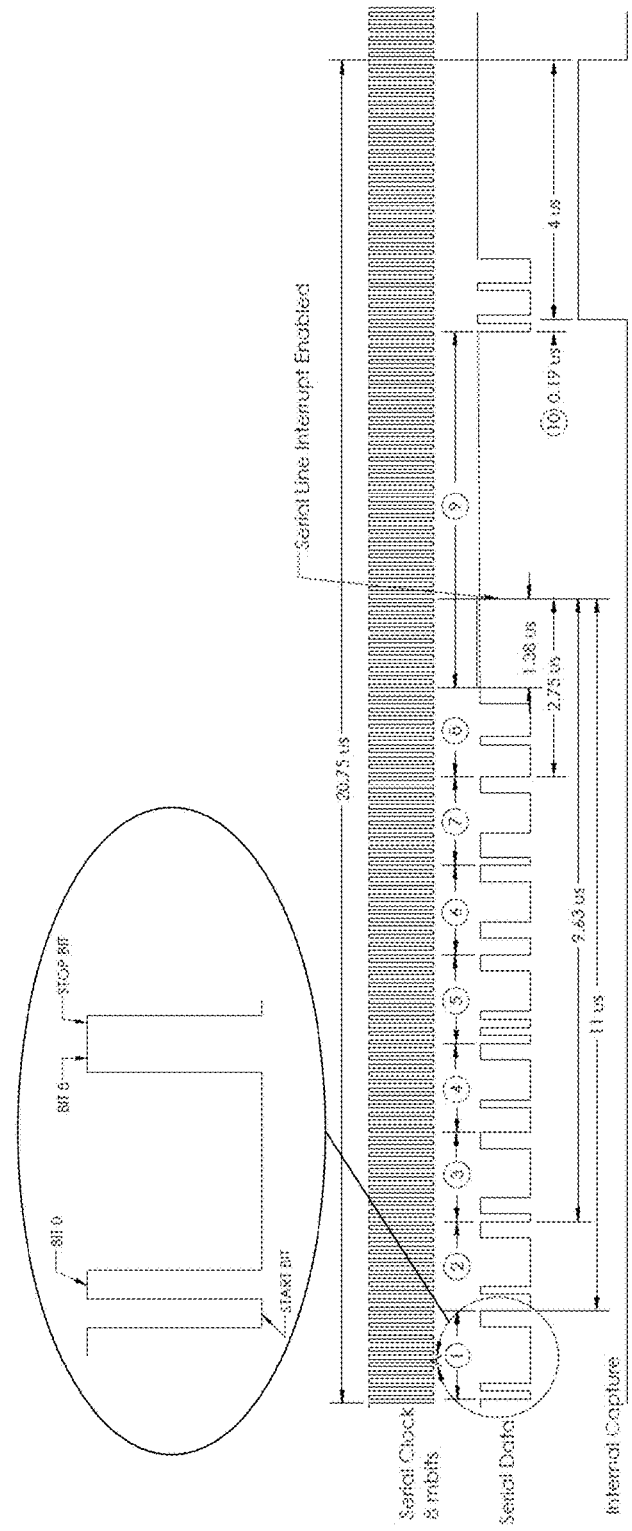

FIG. 10A illustrates an exemplary timing chart of the exemplary electronics of FIG. 9 in operation. In operation, the main processor 160 may send (via wires 164 and 166) a capture command at predetermined intervals (e.g., 960 microseconds) to the processors 70 of the encoder PCB 36. As seen in FIG. 10A, each processor 70 receives the capture command. In response, an interrupt service routine in the processor 70 generates an internal capture with a fixed calibrated latency among encoder PCB 36 of, for example, 1.2 microseconds. As shown in FIG. 10A, the internal capture pulse may be active low (or activate high as shown in some of the other exemplary timing diagrams) and have a typical length of, for example, 5 microseconds FIG. 10B illustrates another exemplary timing chart of the exemplary electronics of FIG. 9 in operation. In operation, the main processor 160 may send (via wires 164 and 166) capture commands at predetermined intervals (e.g., 960 microseconds) to each of the processors 70 of the encoder PCB 36. As seen in FIG. 10B, each processor 70 receives their capture command. At (1) the first encoder processor 70 enables the serial line interrupt 8 data bytes or 11 μs (8*11 bits/data byte*125 ns/bit) after receiving its capture command. At (2) the second encoder processor 70 enables the serial line interrupt 7 data bytes or 9.625 (~9.63) μs after receiving its capture command and so on for the third to sixth encoder processors 70. At (7) the 7th encoder processor 70 enables the serial line interrupt 2 data bytes or 2.75 μs after receiving its capture command. At (8) option port processor 70 enables the serial line interrupt 1 data byte or 1.375 (~1.38) μs after receiving its capture command. Next, at (9), the main processor 160 sends a read data command to the first encoder processor 70, a hardware interrupt is generated on the falling edge of the start bit, and an interrupt service routine in the processor 70 generates an internal capture in about 0.19 μs. As shown in FIG. 10B, the internal capture pulse may be active high (or active low as shown in some of the other exemplary timing diagrams) and have a typical length of, for example, 4 microseconds.

Figure 10C:
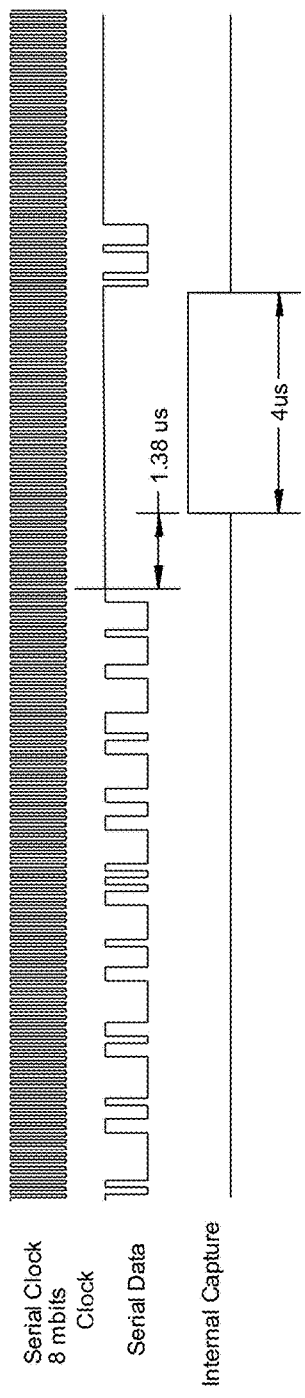

FIG. 10C illustrates another exemplary timing chart of the exemplary electronics of FIG. 9 in operation. As shown in FIG. 10C, the processor 70 could initiate an internal capture 1.38 microseconds after receiving the last capture command. This method may have a larger error than some of the methods described above mostly due to clock errors introduced by the use of different processors 70.

Figure 10D:
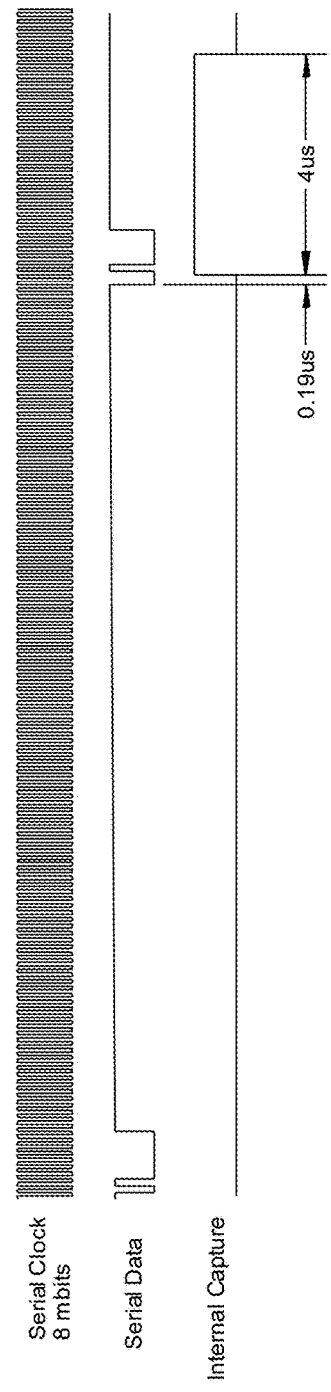

FIG. 10D illustrates another exemplary timing chart of the exemplary electronics of FIG. 9 in operation. As shown in FIG. 10D, in dual pair (A-B pair and Y-Z pair, full duplex) serial configuration, once the capture command is received by the encoder processors 70, each processor 70 enables the serial line interrupt. Next, the main processor 160 sends a read data command to the first encoder processor 70, a hardware interrupt is generated on the falling edge of the start bit, and an interrupt service routine in the processor 70 generates an internal capture in about 0.19 μs.

Figure 10E:
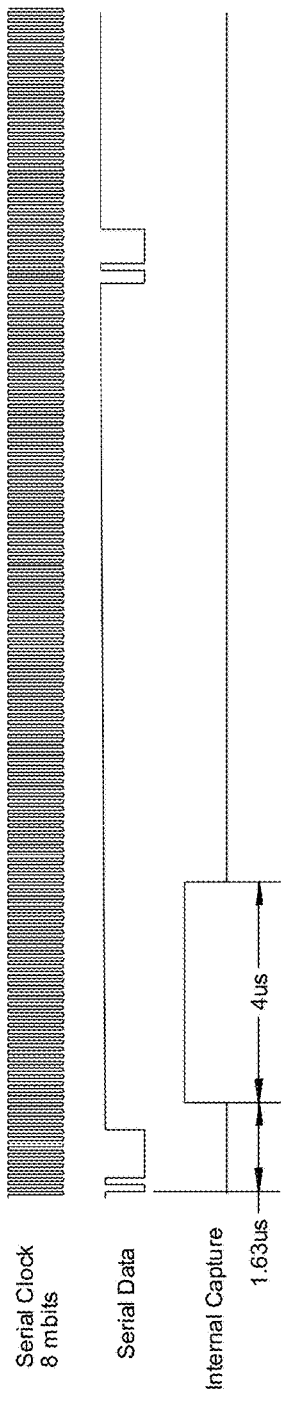

FIG. 10E illustrates another exemplary timing chart of the exemplary electronics of FIG. 9 in operation. As shown in FIG. 10E, in dual pair (A-B pair and Y-Z pair, full duplex) serial configuration, once a capture command is received by an the encoder processors 70, each processor 70 can immediately initiate an Internal Capture with a typical latency of 1.63 microseconds. This method is less precise than some of the methods described above due to the variation in clock frequency of processors 70.

Figure 10F:
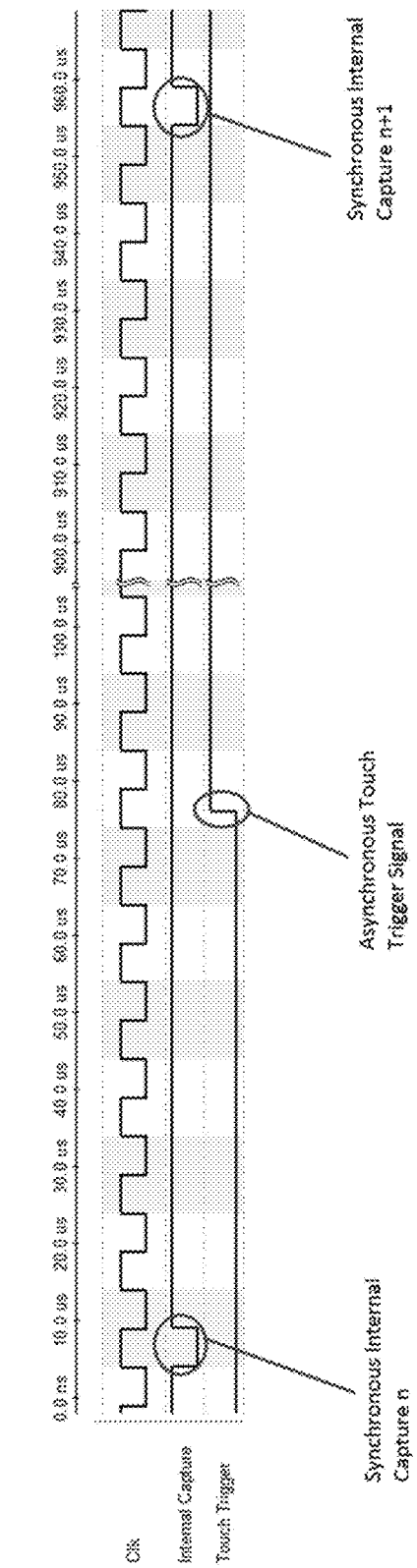

As shown in FIG. 10F, on PCB 130 the interrupt service routine for capture command (n), stores and resets an interval timer/counter. The asynchronous trigger from, for example, the touch trigger probe accessory captures and stores the value of the interval timer/counter. On the subsequent capture command (n+1), the interval timer/counter is stored and reset.

To find the position of the probe 6 at the time the asynchronous trigger, the vector difference between positions (n) and (n+1) may be multiplied by the ratio of the asynchronous trigger captured value divided by the (n+1) position captured value and added to the position (n) vector. In an alternative embodiment, the asynchronous trigger may also have a fixed calibrated latency, which may be subtracted from the asynchronous trigger captured value to arrive at the true position. In another embodiment, an asynchronous trigger port (not shown) at the base of the arm may be use to trigger an internal timer/counter in the main processor 160.

Thus, by accounting and correcting for latency at each PCB 36, the electronics of the CMM 1 may take accurate measurements without requiring dedicated capture and trigger wires.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A portable coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base;
wherein at least one of the rotary joints of the plurality of rotary joints includes:
first and second bearings;
a shaft that engages an inner race of the first bearing and an inner race of the second bearing, the shaft configured to rotate about an axis of rotation of the first bearing and the second bearing;
a housing having at least one port that engages at least one of an outer race of the first bearing and an outer race of the second bearing; and
at least one transducer configured to output an angle signal corresponding to an angle of rotation of the shaft relative to the housing about the axis of rotation,
wherein a first joint, from the plurality of joints, is attached to a second joint, from the plurality of joints, by a structure that is in contact with the inner or outer race of a bearing of the first joint or the inner or outer race of a bearing of the second joint, the structure fabricated from steel, stainless steel, or a controlled expansion alloy lighter in weight than steel and having a thermal expansion coefficient matching that of steel or stainless steel in the range of between of 9.9 to 18 µm/m° C. at 25° C.

2. The CMM of claim 1, wherein
in at least one joint of the plurality of joints a) the shaft that engages the inner race of at least one of the first bearing and the second bearing and b) the port of the housing that engages the outer race of at least one of the first bearing and the second bearing are fabricated of steel.

3. The CMM of claim 1, wherein all structural portions of at least one of the plurality of rotary joints are fabricated of steel.

4. The CMM of claim 1, wherein any structural portions of the CMM including the plurality of arm segments and the plurality of rotary joints are fabricated of a controlled expansion alloy lighter in weight than steel and having a thermal expansion coefficient matching that of steel or stainless steel in the range of between of 9.9 to 18 µm/m° C. at 25° C.

5. The CMM of claim 1, wherein
the shaft has no portion whose diameter is larger than an inner diameter of the first bearing or an inner diameter of the second bearing, and
the at least one port of the housing has no portion whose diameter is narrower than an outer diameter of the first bearing or an outer diameter of the second bearing.

6. The CMM of claim 1, the measurement probe including a handle mechanically but not electrically operably coupled to the first end, the handle rotatably coupled to the first end to rotate about a central axis of the measurement probe, the handle including:
a wireless transmitter; and
at least one switch button operably connected to the wireless transmitter and configured to, when pressed, cause the wireless transmitter to transmit a wireless signal that corresponds to the CMM taking a measurement.

7. The CMM of claim 1, comprising:
an electrical circuit including a serial communication circuit configured without a dedicated capture wire to receive the angle signal and other signals from other transducers in the CMM, the electrical circuit configured to output an agglomeration of the angle signal and the other signals to provide information corresponding to a position of the measurement probe relative to the base.

8. A portable coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base;
wherein at least one of the rotary joints includes:
first and second bearings;
a shaft that engages an inner diameter of the first bearing and an inner diameter of the second bearing, the shaft configured to rotate about an axis of rotation of the first bearing and the second bearing;
a housing having at least one port that engages at least one of an outer diameter of the first bearing and an outer diameter of the second bearing; and at least one transducer configured to output an angle signal corresponding to an angle of rotation of the shaft relative to the housing about the axis of rotation, wherein at least one of the plurality of arm segments or at least one of the plurality of rotary joints are fabricated of a controlled expansion alloy lighter in weight than steel and having a thermal expansion coefficient matching that of steel or stainless steel in the range of between of 9.9 to 18 μm/m° C. at 25° C.

9. The CMM of claim 8, wherein in at least one joint of the plurality of joints a) the shaft that engages the inner diameter of at least one of the first bearing and the second bearing and b) the port of the housing that engages the outer diameter of at least one of the first bearing and the second bearing are fabricated of a controlled expansion alloy lighter in weight than steel and having a thermal expansion coefficient matching that of steel or stainless steel in the range of between of 9.9 to 18 μm/m° C. at 25° C.

10. The CMM of claim 8, wherein a first joint, from the plurality of joints, is attached to a second joint, from the plurality of joints, by a structure that is in contact with the inner or outer diameter of a bearing of the first joint or the inner or outer diameter of a bearing of the second joint, the structure fabricated of a controlled expansion alloy lighter in weight than steel and having a thermal expansion coefficient matching that of steel or stainless steel in the range of between of 9.9 to 18 μm/m° C. at 25° C.

11. A portable coordinate measurement machine (CMM) comprising:
a manually-positionable articulated arm having first and second ends, the articulated arm including a plurality of arm segments and a plurality of rotary joints, the first end including a connector configured to connect to a measurement probe and the second end including a base;
wherein at least one of the rotary joints includes:
first and second bearings;
a shaft that engages an inner diameter of the first bearing and an inner diameter of the second bearing, the shaft configured to rotate about an axis of rotation of the first bearing and the second bearing;
a housing having at least one port that engages at least one of an outer diameter of the first bearing and an outer diameter of the second bearing; and
at least one transducer configured to output an angle signal corresponding to an angle of rotation of the shaft relative to the housing about the axis of rotation,
wherein all structural portions of at least one of the plurality of rotary joints are fabricated of steel, stainless steel, or of a controlled expansion alloy lighter in weight than steel and having a thermal expansion coefficient matching that of steel or stainless steel in the range of between of 9.9 to 18 μm/m° C. at 25° C.

12. The CMM of claim 11, wherein in at least one joint of the plurality of joints a) the shaft that engages the inner diameter of at least one of the first bearing and the second bearing and b) the port of the housing that engages the outer diameter of at least one of the first bearing and the second bearing are fabricated of steel.

13. The CMM of claim 11, wherein a first joint, from the plurality of joints, is attached to a second joint, from the plurality of joints, by a steel structure that is in contact with the inner or outer diameter of a bearing of the first joint or the inner or outer diameter of a bearing of the second joint.

14. The CMM of claim 11, wherein any structural portions of the CMM including the plurality of arm segments and the plurality of rotary joints are fabricated of a controlled expansion alloy lighter in weight than steel and having a thermal expansion coefficient matching that of steel or stainless steel in the range of between of 9.9 to 18 μm/m° C. at 25° C.

15. The CMM of claim 11, wherein
the shaft has no portion whose diameter is larger than an inner diameter of the first bearing or an inner diameter of the second bearing, and
the at least one port of the housing has no portion whose diameter is narrower than an outer diameter of the first bearing or an outer diameter of the second bearing.

16. The CMM of claim 11, the measurement probe including a handle mechanically but not electrically operably coupled to the first end, the handle rotatably coupled to the first end to rotate about a central axis of the measurement probe, the handle including:
a wireless transmitter; and
at least one switch button operably connected to the wireless transmitter and configured to, when pressed, cause the wireless transmitter to transmit a wireless signal that causes the CMM to take a measurement.

17. The CMM of claim 11, comprising:
an electrical circuit including a serial communication circuit configured without a dedicated capture wire to receive the angle signal and other angle signals from other transducers in the CMM, the electrical circuit configured to output an agglomeration of the angle signal and the other angle signals to provide information corresponding to a position of the measurement probe relative to the base.

18. The CMM of claim 11, wherein the at least one of the rotary joints includes:
a rotary damping mechanism operably coupled to the shaft and the housing and configured to provide controlled damping of rotational movement of the shaft about the axis of rotation.

19. The CMM of claim 11, wherein
the at least one of the rotary joints includes:
a rotary damping mechanism configured to provide controlled damping of rotational movement of the shaft about the axis of rotation; and
a circuit operably connected to the at least one transducer and configured to output a speed signal corresponding to the speed of the rotational movement of the shaft about the axis of rotation based on the angle signal and time, the circuit further configured to compare the speed signal to a predetermined speed threshold to determine whether the rotational movement occurred at excessive speed or as a result of excessive torque.

20. The CMM of claim 11, wherein
the at least one of the rotary joints includes:
a rotary damping mechanism configured to provide controlled damping of rotational movement of the shaft about the axis of rotation; and
at least one strain gauge operably coupled to at least one of the shaft and the housing and configured to sense strain on the at least one of the shaft and the housing due to the rotational movement of the shaft about the axis of rotation and to output a strain signal; and
the CMM includes:
a circuit configured to calculate location of the measurement probe based in part on the strain signal.

* * * * *